US011423217B2

(12) United States Patent
Beers

(10) Patent No.: US 11,423,217 B2
(45) Date of Patent: Aug. 23, 2022

(54) FLEXIBLE TABLE BASED VISUALIZATIONS

(71) Applicant: Tableau Software, LLC, Seattle, WA (US)

(72) Inventor: Andrew C. Beers, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 16/984,014

(22) Filed: Aug. 3, 2020

(65) Prior Publication Data

US 2021/0142001 A1   May 13, 2021

Related U.S. Application Data

(60) Provisional application No. 62/932,329, filed on Nov. 7, 2019.

(51) Int. Cl.
*G06F 40/18* (2020.01)
*G06F 16/26* (2019.01)
*G06F 16/23* (2019.01)

(52) U.S. Cl.
CPC .......... *G06F 40/18* (2020.01); *G06F 16/2393* (2019.01); *G06F 16/26* (2019.01)

(58) Field of Classification Search
None
See application file for complete search history.

(56) References Cited

U.S. PATENT DOCUMENTS

| 5,550,971 | A | 8/1996 | Brunner et al. |
| 5,689,711 | A | 11/1997 | Bardasz et al. |
| 9,383,913 | B2 | 7/2016 | Hoyer et al. |
| 9,489,119 | B1 | 11/2016 | Smith, Jr. |
| 10,705,695 | B1 | 7/2020 | Porath et al. |
| 10,783,162 | B1 | 9/2020 | Montague et al. |
| 2009/0006939 | A1* | 1/2009 | DeSpain ................. G06F 40/18 715/217 |

(Continued)

FOREIGN PATENT DOCUMENTS

WO    WO-2006060773 A2 *  6/2006  ........... G06T 11/206

OTHER PUBLICATIONS

Furmanova et al. ("Taggle: Scalable Visualization of Tabular Data through Aggregation") (Year: 2017).*

(Continued)

*Primary Examiner* — Daniel Rodriguez
*Assistant Examiner* — Gabriel Mercado
(74) *Attorney, Agent, or Firm* — John W. Branch; Branch Partners PLLC

(57) ABSTRACT

Embodiments are directed to visualizing data. A graphical user interface (GUI) that includes a shelf panel and a display panel may be generated. Column fields may be generated and displayed in the shelf panel based on a data source or a table specification. The table specification may be employed to generate a table view that may be displayed in the display panel such that the table view includes columns that correspond to each column field. Data items may be determined based on the data source and the column fields such that each column field corresponds to a portion of the data items. Each portion of the data items may be displayed in a column of the table view that corresponds to the column field that corresponds to the portion of the data items.

32 Claims, 22 Drawing Sheets

(56) References Cited

U.S. PATENT DOCUMENTS

| | | |
|---|---|---|
| 2010/0235771 A1 | 9/2010 | Gregg, III |
| 2010/0313157 A1 | 12/2010 | Carlsson et al. |
| 2010/0318583 A1 | 12/2010 | Cohen |
| 2011/0219321 A1* | 9/2011 | Gonzalez Veron ..... G06F 3/048 715/764 |
| 2012/0311497 A1 | 12/2012 | Bear et al. |
| 2014/0026084 A1 | 1/2014 | Gilboa |
| 2014/0058789 A1 | 2/2014 | Doehring et al. |
| 2014/0074888 A1 | 3/2014 | Potter et al. |
| 2014/0215405 A1 | 7/2014 | Breedvelt-Schouten |
| 2014/0267287 A1 | 9/2014 | Dodgen et al. |
| 2014/0372956 A1 | 12/2014 | Bisca et al. |
| 2015/0112998 A1 | 4/2015 | Shankar et al. |
| 2016/0103908 A1 | 4/2016 | Fletcher et al. |
| 2016/0224532 A1 | 8/2016 | Miller et al. |
| 2016/0224616 A1 | 8/2016 | Beacom et al. |
| 2016/0314605 A1 | 10/2016 | Filippi et al. |
| 2017/0010787 A1 | 1/2017 | Ranganathan et al. |
| 2017/0075557 A1* | 3/2017 | Noble ................... G06F 40/177 |
| 2017/0091317 A1 | 3/2017 | Cummings et al. |
| 2017/0102694 A1 | 4/2017 | Enver et al. |
| 2017/0103103 A1 | 4/2017 | Nixon et al. |
| 2017/0140068 A1 | 5/2017 | Oh et al. |
| 2017/0154088 A1 | 6/2017 | Sherman |
| 2017/0177681 A1 | 6/2017 | Potiagalov et al. |
| 2017/0177744 A1 | 6/2017 | Potiagalov et al. |
| 2017/0178368 A1 | 6/2017 | Noon et al. |
| 2017/0193049 A1 | 7/2017 | Grehant |
| 2017/0213131 A1 | 7/2017 | Hammond et al. |
| 2017/0220633 A1 | 8/2017 | Porath et al. |
| 2017/0286526 A1 | 10/2017 | Bar-Or et al. |
| 2017/0293666 A1 | 10/2017 | Ragavan et al. |
| 2018/0024731 A1 | 1/2018 | Sanches et al. |
| 2018/0129369 A1 | 5/2018 | Kim et al. |
| 2018/0218050 A1 | 8/2018 | Porath et al. |
| 2018/0260106 A1 | 9/2018 | Leonard et al. |
| 2019/0034489 A1 | 1/2019 | Ziegler |
| 2019/0095395 A1 | 3/2019 | Piecko |
| 2019/0294720 A1 | 9/2019 | Beringer et al. |
| 2019/0332599 A1 | 10/2019 | Woo |
| 2019/0384836 A1 | 12/2019 | Roth et al. |
| 2020/0104401 A1 | 4/2020 | Burnett et al. |
| 2020/0104402 A1 | 4/2020 | Burnett et al. |
| 2020/0372057 A1 | 11/2020 | Tonkin et al. |
| 2021/0263900 A1 | 8/2021 | Joyce et al. |

OTHER PUBLICATIONS

Brunel, Robert et al., "Supporting Hierarchical Data in SAP HANA," 2015 IEEE 31st International Conference on Data Engineering (ICDE), 2015, pp. 1-12.

Pienta, Robert et al., "VISAGE: Interactive Visual Graph Querying," AVI '16, Jun. 7-10, 2016, Bari Italy, pp. 272-279.

Von Landesberger, Tatiana et al., "A System for Interactive Visual Analysis of Large Graphs Using Motifs in Graph Editing and Aggregation," VMV 2009, pp. 1-9.

Office Communication for U.S. Appl. No. 16/586,554 dated Jul. 24, 2020, pp. 1-27.

Office Communication for U.S. Appl. No. 16/586,554 dated Nov. 24, 2020, pp. 1-28.

Office Communication for U.S. Appl. No. 16/586,554 dated Feb. 16, 2021, pp. 1-7.

Office Communication for U.S. Appl. No. 16/586,554 dated Apr. 2, 2021, pp. 1-37.

Office Communication for U.S. Appl. No. 16/725,986 dated Apr. 2, 2021, pp. 1-23.

Papenbrock Thorsten et al., "Data-driven Schema Normalization," in Proceedings of the 20th International Conference on Extending Database Technology, 2017, pp. 342-353.

Office Communication for U.S. Appl. No. 16/586,554 dated Sep. 27, 2021, pp. 1-45.

Office Communication for U.S. Appl. No. 16/725,986 dated Sep. 30, 2021, pp. 1-10.

Office Communication for U.S. Appl. No. 17/091,536 dated Nov. 5, 2021, pp. 1-25.

Office Communication for U.S. Appl. No. 16/944,043 dated Nov. 26, 2021, pp. 1-49.

Office Communication for U.S. Appl. No. 16/586,554 dated Dec. 15, 2021, pp. 1-7.

Office Communication for U.S. Appl. No. 16/586,554 dated Feb. 24, 2022, pp. 1-47.

* cited by examiner

Graphical User Interface 2000

2002
Product
Category
Supplier
Customer
Order
Sales
Profit
Region

2004

Field: | Region | SUM(Sales) | AVG(Profit) | Category
Color:
X: | | | TDAY(...
Marks: | Auto | Auto | Auto | Auto

2006

| Region | SUM(Sales) | AVG(Profit) | Category |
|---|---|---|---|
| Central | 6705.1 | ~ | Office Supplies |
| Central | 4011.2 | ~ | Furniture |
| Central | 3290.7 | ~ | Technology |
| East | 7836.2 | ~ | Office Supplies |
| East | 20056.2 | ~ | Technology |
| East | 13812.8 | ~ | Furniture |
| South | 4583.5 | ~ | Office Supplies |
| South | 6519.1 | ~ | Furniture |
| South | 6206.5 | ~ | Technology |
| West | 29452.1 | ~ | Office Supplies |
| West | 49154.8 | ~ | Technology |
| West | 34876.1 | ~ | Furniture |

# FLEXIBLE TABLE BASED VISUALIZATIONS

CROSS-REFERENCE TO RELATED APPLICATION

This application is a Utility Patent application based on previously filed U.S. Provisional Patent Application No. 62/932,329 filed on Nov. 7, 2019, the benefit of the filing date of which is hereby claimed under 35 U.S.C. § 119(e) and which is further incorporated in entirety by reference.

TECHNICAL FIELD

The present invention relates generally to data visualization, and more particularly, but not exclusively to, table based data analysis.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. In some cases, organizations may generate visualizations of the some or all of their data. Employing visualizations to represent this data may enable organizations to improve their understanding of critical business operations and help them monitor key performance indicators. In some cases, tables are an important visualization type when looking at data. Generally, tables have a well understood one-dimensional structure (a list of rows) and well-understood single and multi-column sorting semantics. Also, tables can display both aggregate and disaggregate data, and its cells are not necessarily limited to textual information. And, in so-called "rich tables", formatting and visual presentation can vary column to column. Despite these advantages and well-known behaviors, effectively leveraging table to provide visualizations may be difficult. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 20 illustrates of a logical schematic of a portion of a user interface for flexible table based visualizations in accordance with one or more of the various embodiments.

DETAILED DESCRIPTION OF VARIOUS EMBODIMENTS

Figure 1:
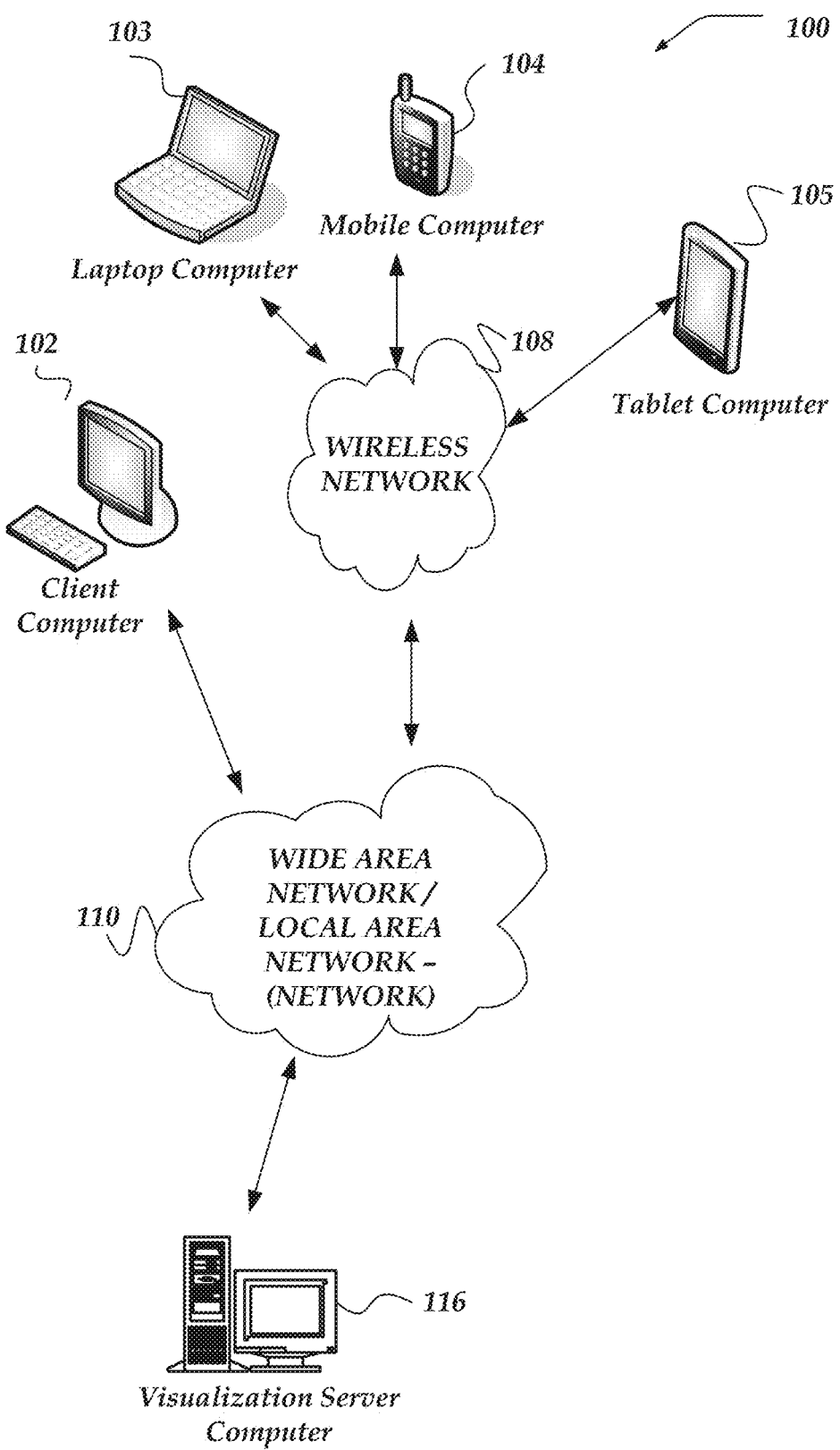
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g., easier to reason about), safer, or the like.

As used herein the term "data object" refers to one or more entities or data structures that comprise data models. In some cases, data objects may be considered portions of the data model. Data objects may represent individual instances of items or classes or kinds of items.

As used herein, the term "record" refers to a data structure that includes one or more fields. Records are often provided by data sources or other data services in response to queries. Multiple records may be provided based on one query. The set of records provided in response to a query may be considered a result set. Each record in a result set may have the same number of fields provided in the same order. Further, fields in records are often associated with a name or label. If records are in the same result set, the names or labels associated with the fields in one record are the same for each record. The records that are included in a result set depend on the query and data in the data source. Also, the fields of each record in a result set may be determined based on the query. Many conventional or custom query languages support syntax that may control the shape or composition of the records returned in a result set. Thus, the records provided in a result set may include values, fields, names, labels, or the like, that are different from the records stored in the data source. For example, a table in a data source may include rows and columns such that each row may be record and each column may define the fields that are in each record. However, a set of records provided in response to a query (e.g., result set) may have fields and records determined based on the query. Accordingly, the records in the result set may have different fields or different cardinality than the source records in the data source. For example, in some cases, queries may request records that include aggregates of field values, such as, counts, sums, averages, or the like. Records provided in response to queries may have their fields, field order, sort order, grouping, values, or the like, determined based on the query.

Also, in some cases, intermediary processes or services may transform or filter result sets provided from a data source or database to provide a different set of records.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "visualization model" refers to one or more data structures that represent one or more representations of a data model that may be suitable for use in a visualization that is displayed on one or more hardware displays. Visualization models may define styling or user interface features that may be made available to non-authoring user.

As used herein the term "table view" refers to a visualization that displays data using a table-like row/column format. Interactive table views may be arranged to follow one or more table-like user interface semantics, such as, sorting, column positioning, cell formatting, header formatting, or the like.

As used herein the term "specification information" refers to information a visualization engine may employ to determine the data, formatting, styling, or the like, of a table view.

As used herein the term "shelf panel" refers to panel that may provide a user interface than enables users to interactively provide specification information for table views.

As used herein the term "column field" refers to a portion of a table view specification information that identifies data objects from a data source that may be included as columns in the table view.

As used herein the term "view feature" refers to a portion of a table view specification that determines layout, styling, formatting, or the like, associated with the table view.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to visualizing data using one or more processors that execute one or more instructions to perform as described herein. In one or more of the various embodiments, a graphical user interface (GUI) that includes a shelf panel and a display panel may be generated.

In one or more of the various embodiments, one or more column fields that may be displayed in the shelf panel may be generated based on one or more data objects in a data source or a table specification.

In one or more of the various embodiments, the table specification may be employed to generate a table view that may be displayed in the display panel such that the table view includes one or more columns that correspond to each column field.

In one or more of the various embodiments, one or more data items may be determined based on the data source and the one or more column fields such that each column field corresponds to a portion of the one or more data items.

In one or more of the various embodiments, each portion of the one or more data items may be displayed in a column of the table view that corresponds to the column field that corresponds to the portion of the one or more data items.

In one or more of the various embodiments, displaying each portion of the one or more data items in a column of the table view may include: providing one or more records from the data source based on one or more queries such that each record includes values from the data source; generating one or more rows of the table view based on the one or more records such that each row includes data items that are in a same record; and in response, to a scrolling action, further actions may be performed, including: providing a scroll window area that includes a portion of the one or more rows based on the scrolling action, a size of the display panel, and an amount of rows in the table view; and determining a portion of the one or more rows to display based on the scroll window area.

In one or more of the various embodiments, in response to determining two or more adjacent column fields associated with a same breakup field further actions may be performed, including: determining one or more breakup categories based on the same breakup field such that each breakup category corresponds to a distinct value of the same breakup field; generating one or more category columns in the table view such that each category column corresponds to one of the one or more breakup categories; generating one or more sub-columns in each of the one or more category columns such that each sub-column corresponds to one of the two or more adjacent column fields; determining one or more category data items based on the portion of the one or more data items that correspond to each breakup category; and displaying the one or more category data items in the one or more sub-columns such that each category data item may be displayed in one of the one or more sub-columns included in a category column that corresponds to its breakup category and its column field.

In response to determining one or more breakdown fields, performing further actions, including: generating one or more regular columns for each column field that may be unassociated with the one or more breakdown fields; determining one or more breakdown categories based on the one or more breakdown fields such that each breakdown category may correspond to a distinct value of the one or more breakdown fields; generating one or more sub-columns for each of the one or more breakdown categories such that each sub-column corresponds to a column field associated with the one or more breakdown fields and such that each sub-column is grouped together based on the one or more breakdown categories; determining one or more regular data items based on the one or more data items that may correspond to the one or more regular columns; determining one or more breakdown data items based on the portion of the one or more data items that may correspond to each breakdown category; displaying the one or more regular data items in the one or more regular columns; and displaying each breakdown data item in the one or more sub-columns that correspond to its breakdown category and its column field.

In one or more of the various embodiments, in response to determining one or more column fields associated with a minified visualization view feature further actions may be performed, including: executing one or more queries to provide one or more feature data items based on the one or more column fields associated with the minified visualization view feature such that the one or more feature data items; generating one or more minified visualizations based on the one or more feature data items and the minified visualization view feature; and displaying the one or more minified visualizations in the one or more columns of the table view that correspond to the one or more column fields associated with the minified visualization view feature.

In one or more of the various embodiments, in response to one or more view features being added to the shelf panel, further actions may be performed, including: updating the table specification based on the one or more view features; determining the one or more column fields that correspond to the one or more view features based on the updated table specification; modifying each table column that corresponds to the one or more determined column fields based on the updated table specification such that each portion of data items that correspond to the one or more determined column fields may be modified based on the updated table specification; or the like.

In one or more of the various embodiments, one or more data objects may be displayed in a data panel that may be associated with the data source. And, in some embodiments, the one or more column fields may be determined based on the one or more data objects displayed in the data panel.

In one or more of the various embodiments, in response to a modification of the table view, further actions may be performed, including: further modifying the table specification based on the modification of the table view such that the further modifications to the table specification may include, changing an order of the column fields based on a modified column order in the table view, adding one or more sorting view features based on a current sort order of the one or more data items, or the like.

In one or more of the various embodiments, one or more marks may be associated with each column field based on the table specification. And, in some embodiments, a value associated with each data item may be displayed in the table view based on the one or more marks such that the one or more marks may include, text, formatted numbers, symbols, visualizations that are displayed in one or more table cells for one or more data items, or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, or other computers.

Client computers 102-105 may further be configured to include a client application that enables an end-user to log into an end-user account that may be managed by another computer, such as visualization server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 or the like, as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
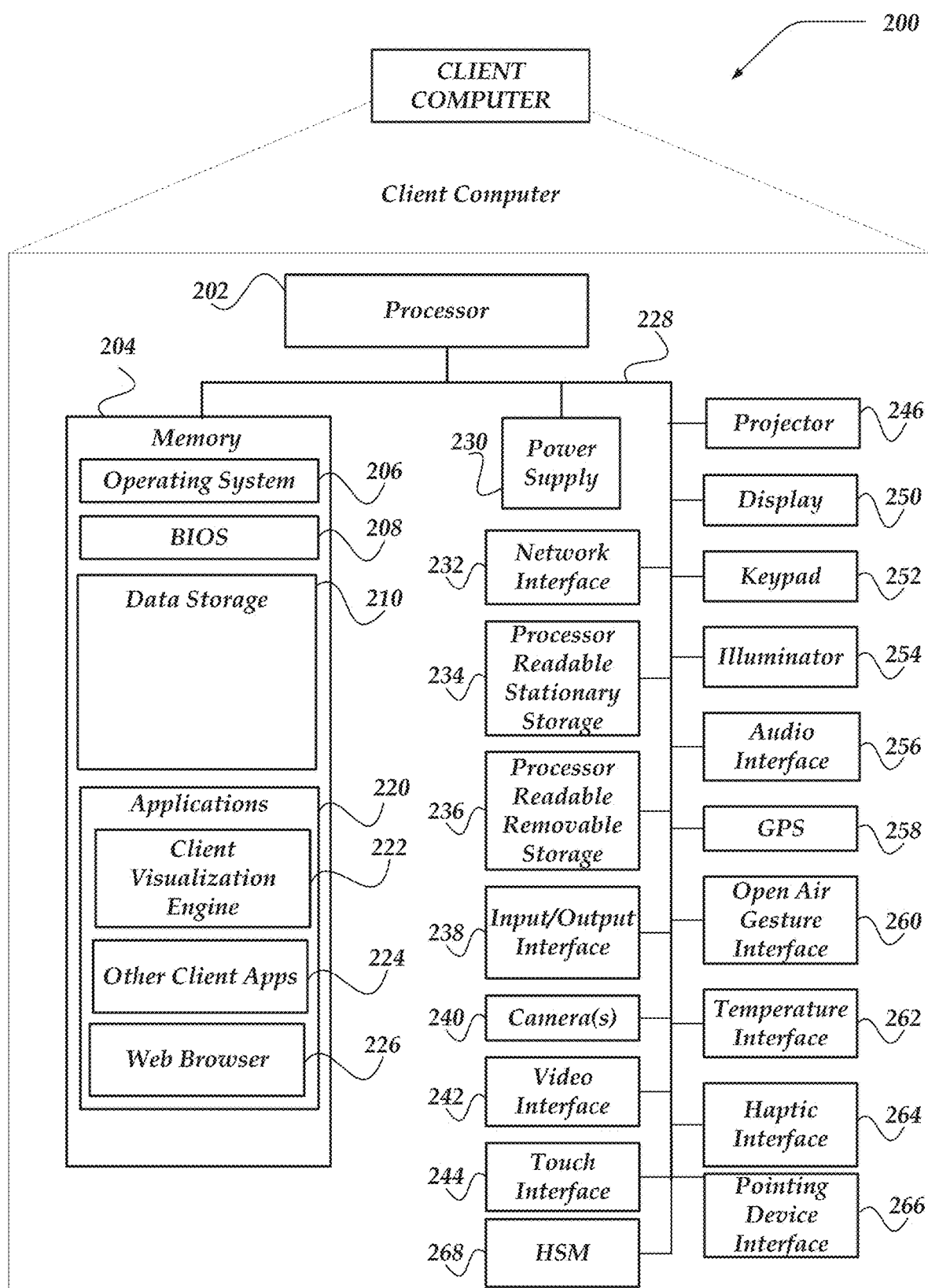
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client visualization engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
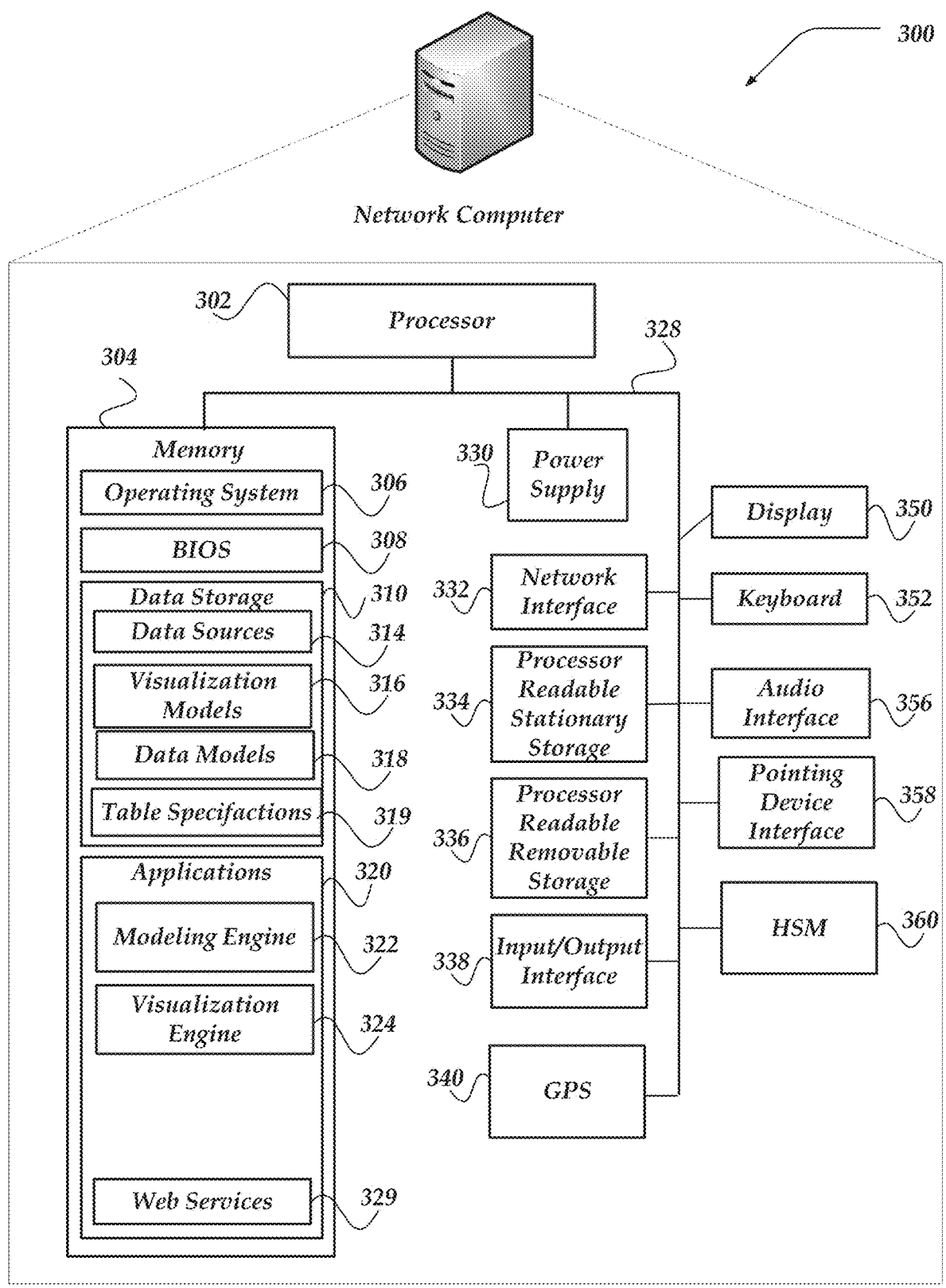
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of visualization server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, visualization engine 324, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data sources 314, visualization models 316, data models 318, table specifications 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, visualization engine 324, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, visualization engine 324, other applications 329, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, visualization engine 324, other applications 329, or the like, may be provisioned and de-commissioned automatically.

Also, in one or more of the various embodiments, modeling engine 322, visualization engine 324, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
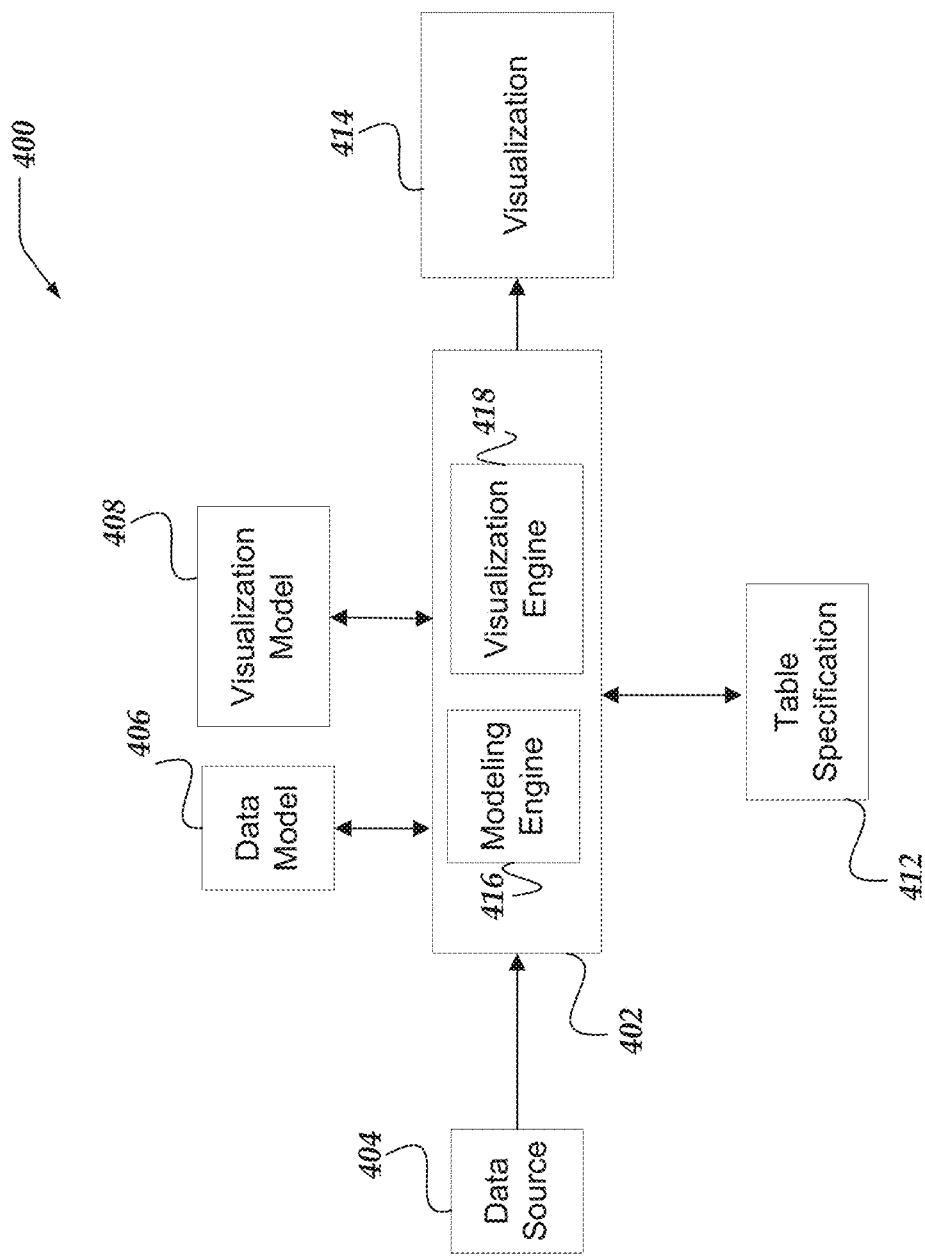
FIG. 4 illustrates a logical architecture of a system for flexible table based visualizations in accordance with one or more of the various embodiments.

FIG. 4 illustrates a logical architecture of system 400 for flexible table based visualizations in accordance with one or more of the various embodiments. In one or more of the various embodiments, system 400 may be a visualization platform arranged to include various components including: visualization server 402; one or more data sources, such as, data source 404; one or more data models, such as, as data model 406, one or more visualization models, such as, visualization model 408; one or more table specifications, such as, table specifications 412; one or more visualizations, such as, visualization 414; one or more modeling engines, such as, modeling engine 416; one or more visualization engines, such as, visualization engine 418; or the like.

In one or more of the various embodiments, visualization servers, such as, visualization server 402 may be arranged to generate one or more visualizations, such as, visualization 414. In some embodiments, visualization server 402 may be arranged to obtain information from data sources, such as, data source 404. Accordingly, in some embodiments, some or all of the information provided by data source 404 may be mapped to or otherwise extracted and transformed into one or more of one or more data models or visualization models. Thus, in some embodiments, visualization servers may be arranged to generate one or more visualizations, such as, visualization 414 based the data models or visualization models.

In some embodiments, a modeling engine, such as, modeling engine 416 may be employed to transform some or all of information provided by data source 404 into one or more data models, such as, data model 406. In some embodiments, the modeling engine may be arranged to employ or execute computer readable instructions provided by configuration information to determine some or all of the steps for transforming information provided by data sources into data models.

In one or more of the various embodiments, configuration information, including user input, may be employed to select one or more portions of the information provided by data sources to transform into a data model.

In one or more of the various embodiments, visualization models may be comprised of one or more display objects. In some embodiments, display objects may represent a visualization or partial visualization of the data associated with one or more data objects. The particular visualization expressed by a display object may be selected based the composition (e.g., data type, properties, number of items, semantic meaning, or the like) of a given data object. In some embodiments, a data object may be associated with more than one display object, each representing a different visualization of the given data object. Accordingly, display objects may be arranged to represent different common, uncommon, or custom, visualization elements, such as, line plots, surface plots, bar charts, pie charts, tables, text fields, text areas, or the like, that may be included in visualizations to provide improved understanding of data. In some embodiments, visualizations may be targeted for different audiences, such as, customers, stakeholders, internal teams, business intelligence teams, or the like. Accordingly, more than one display model may be generated or associated with the same data model.

Further, in one or more of the various embodiments, modeling engines, such as, modeling engine 416 may be arranged to enable flexible table based visualizations.

Accordingly, in one or more of the various embodiments, modeling engines or visualization engines may be arranged to employ one or more table specifications, such as, table specifications 412 to generate table visualizations based on one or more portions of a data model, such as, data model 406

Figure 5A:
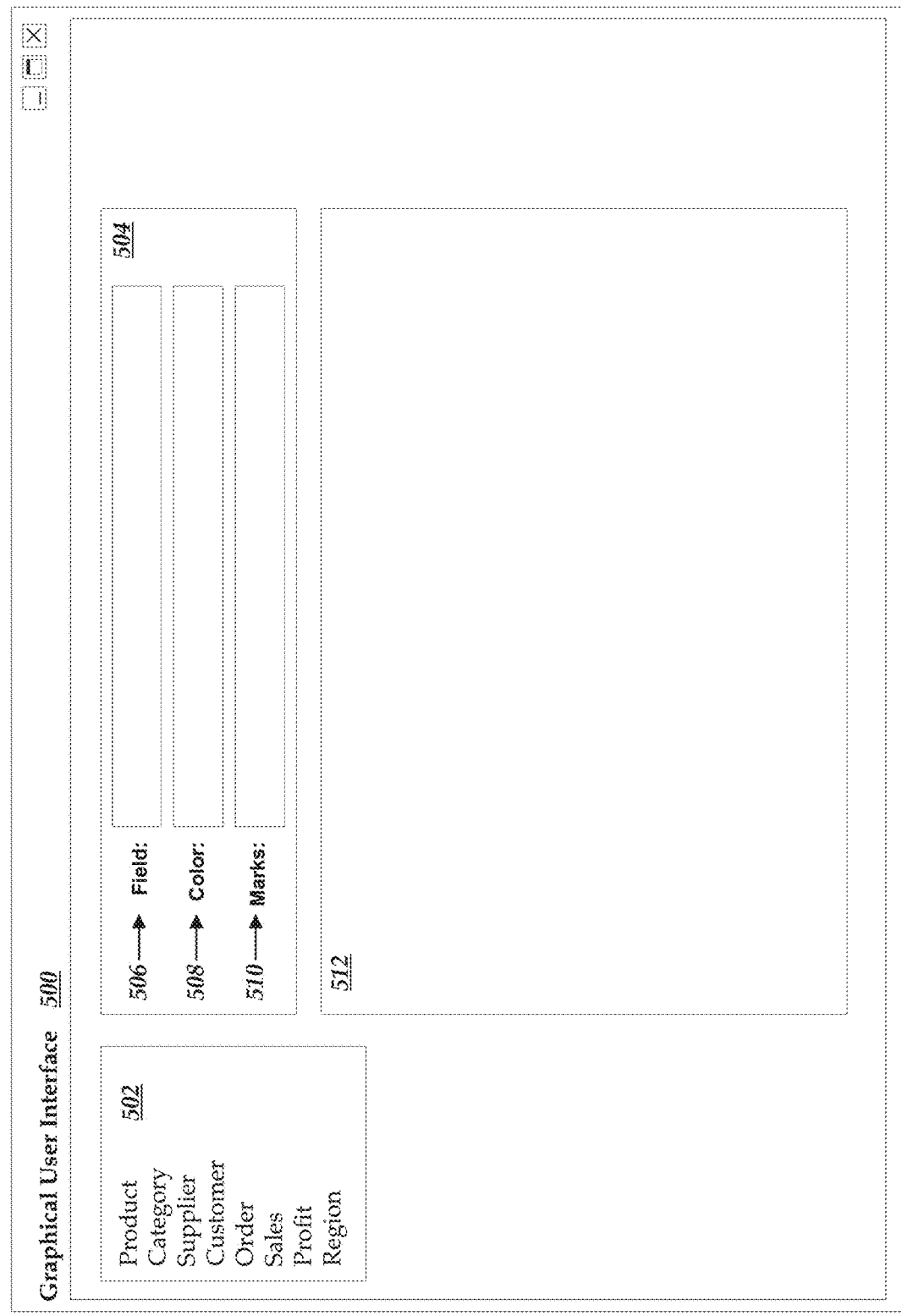
FIG. 5A illustrates a logical representation of a portion of a user interface for flexible table based visualizations in accordance with one or more of the various embodiments.

FIG. 5A illustrates a logical representation of a portion of user interface 500 for flexible table based visualizations in accordance with one or more of the various embodiments. In some embodiments, user interface 500 may be arranged to include one or more panels, such as, data panel 502, shelf panel 504, display panel 512, or the like.

In one or more of the various embodiments, user interface 500 may be displayed on one or more hardware displays, such as, client computer displays, mobile device displays, or the like. In some embodiments, user interface 500 may be provided via a native application or as a web application hosted in a web browser or other similar applications. One of ordinary skill in the art will appreciate that for at least clarity or brevity many details common to commercial/production user interfaces have been omitted from user interface 500. Likewise, in some embodiments, user interfaces may be arranged differently than shown depending on local circumstances or local requirements. However, one of ordinary skill in the art will appreciate that the disclosure/description of user interface 500 is at least sufficient for disclosing the innovations included herein.

In this example, data panel 502 is employed to display portions of data sources or data models that may be available to include in a table view. In this example, the listed items represent column fields that may be added to a specification information for a table view. In some embodiments, the particular items shown in a data panel may be determined based on configuration information that that may identify portions of data sources or data models that may be available at given time.

In some embodiments, shelf panel 504 may provide a user interface that enables users or visualization authors to interactively define specification information for a table view. In some embodiments, shelf panels may be arranged to display one or more shelf rows that display representations of the specification information that may be employed to generate table views.

In one or more of the various embodiments, the number of shelves in a shelf panel may vary depending on the specification information of the table view. In this example, shelf row 506 represents the column fields that should be included in a table view. Shelf row 508 represents the color that should be used for data items associated with a column field. Shelf row 510 represents mark formatting for the data items associated with a column field.

In this example, the shelf rows are represented as being empty because there is no corresponding table view being displayed.

In this example, display panel 512 is employed to display one or more portions of a visualization of a table generated based on the table specification information represented in shelf panel 504.

In this example, display panel 512 is represented as being empty because the table specification for user interface 500 is empty or otherwise not available.

Figure 5B:
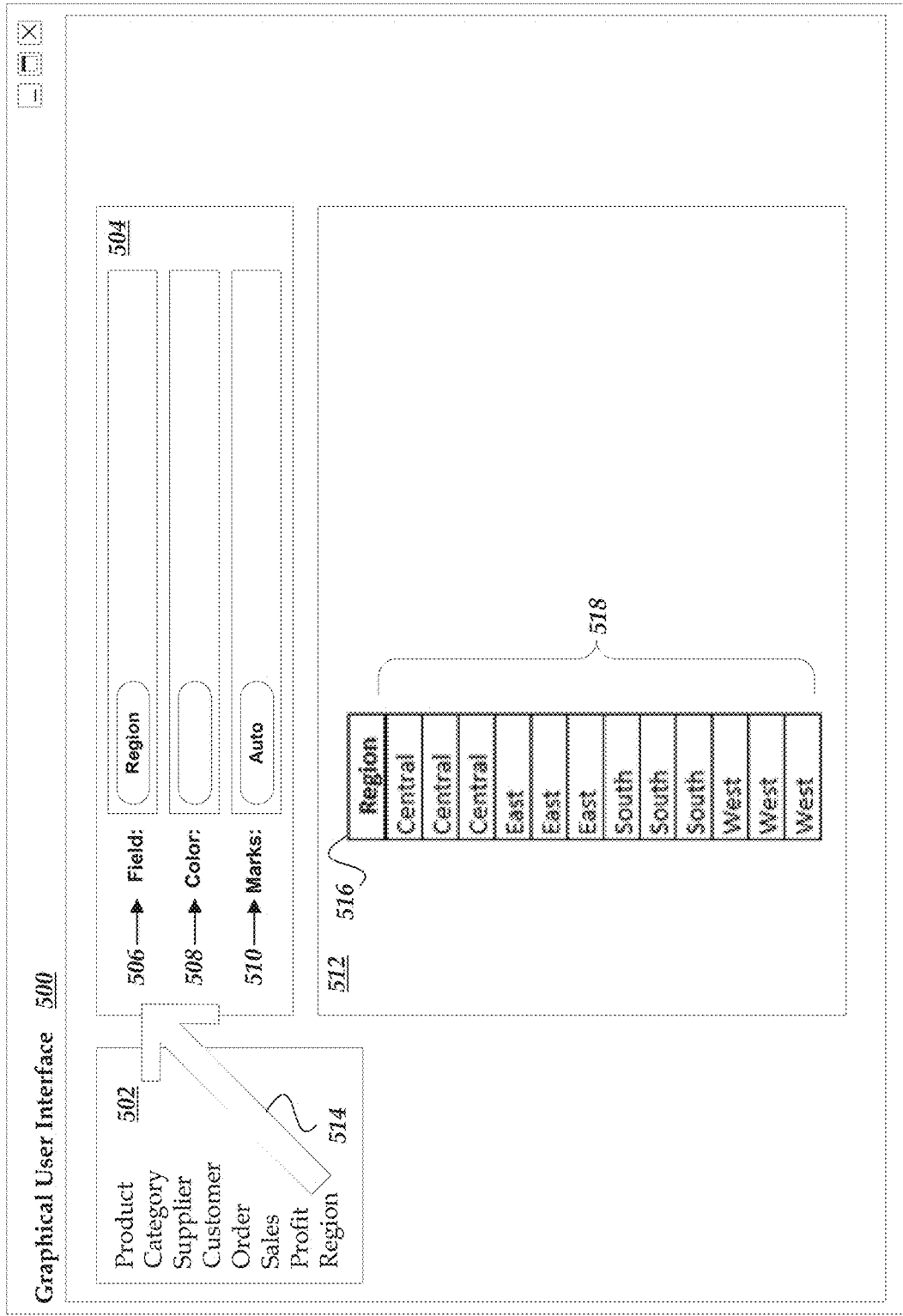
FIG. 5B illustrates a logical representation of a portion of a user interface for flexible table based visualizations in accordance with one or more of the various embodiments.

FIG. 5B illustrates a logical representation of a portion of user interface 500 for flexible table based visualizations in accordance with one or more of the various embodiments. For brevity and clarity, elements or behaviors of user interface 500 described above for FIG. 5A are not repeated here.

In one or more of the various embodiments, user interface 500 may be arranged to enable users or authors to select column fields from data panel 502 for inclusion in specification information for a table view. In this example, large arrow 514 represents that the Region column field has been added to shelf row 506. Accordingly, in some embodiments, the first position in shelf row 506 may be populated with a user interface element that indicates that the column field has been included in the specification information. Further, in some embodiments, two additional shelf rows are included in shelf panel 504 by default. In this example, shelf row 508 represents a default shelf row used for assigning a foreground color to the data items for a column field. In this example, the color indicator is blank to represent that a default color should be used. Also, in this example, shelf row 510 represents a default shelf row used for assigning a mark type to the data item associated with a data field. Here, the mark type is shown to default to automatic. This may be considered default behavior that enables the visualization engine to determine the mark type based on one or more characteristics of the data items.

In one or more of the various embodiments, visualization engines may be arranged to determine automatic or defaulting behavior based on configuration information to account for local requirements or local circumstances such as localization, display types, or the like.

In one or more of the various embodiments, visualization engines may be arranged to determine the data items that may correspond to a column field. Accordingly, in some embodiments, the visualization engine may be arranged to generate a table view based on the specification information shown in shelf panel 504. In this example, a table view with one column of data items is generated and displayed in display panel 512. In this example, table view 516 represents a table view that includes data items 518.

Figure 5C:
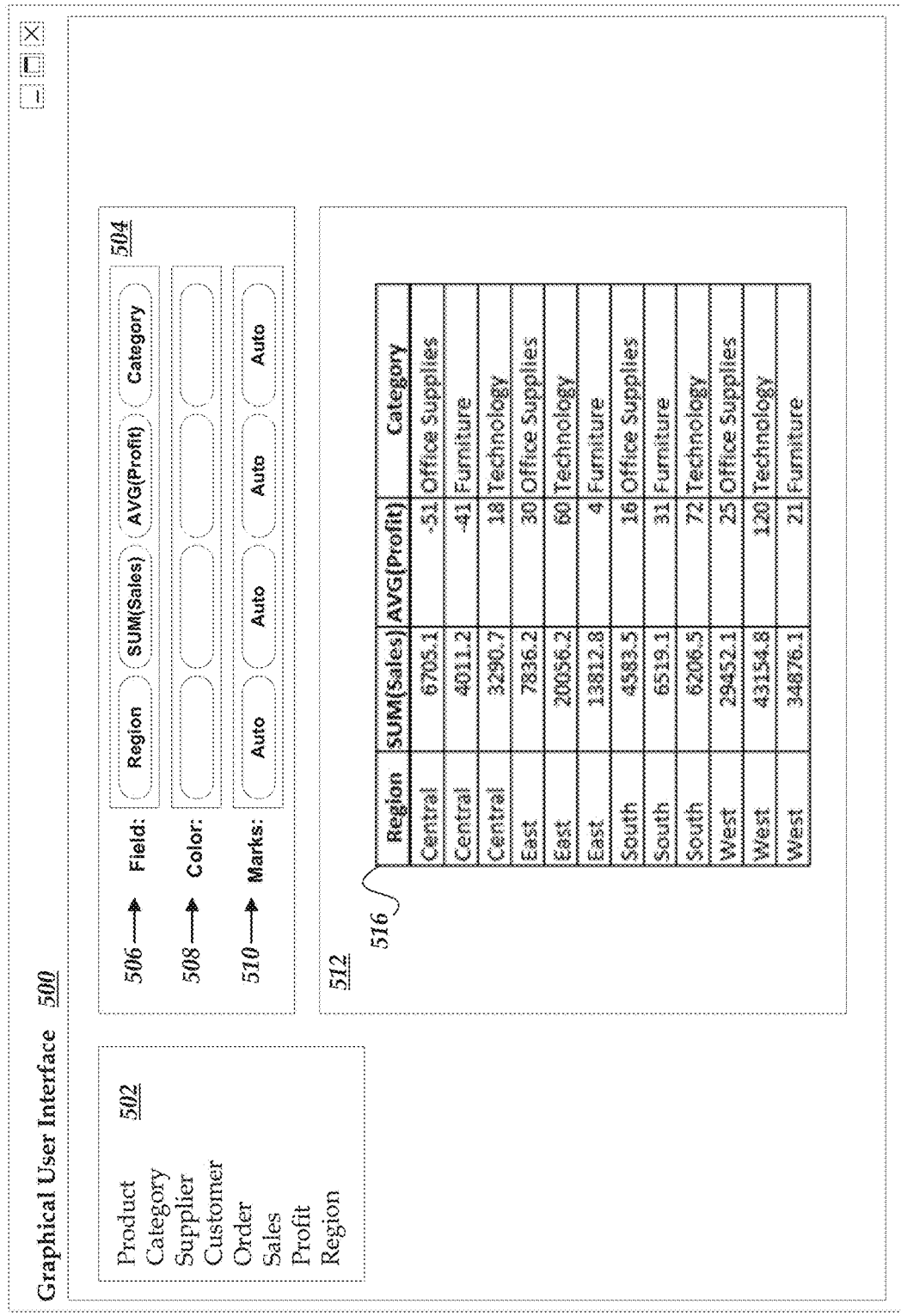
FIG. 5C illustrates a logical representation of a portion of a user interface for flexible table based visualizations in accordance with one or more of the various embodiments.

FIG. 5C illustrates a logical representation of a portion of user interface 500 for flexible table based visualizations in accordance with one or more of the various embodiments. For brevity and clarity, elements or behaviors of user interface 500 described above for FIG. 5A and FIG. 5B are not repeated here.

In this example, table view 516 has four columns that correspond to the four column fields (e.g., Region, SUM (Sales), AVG(Profit), and Category) that have been added to shelf row 506.

In one or more of the various embodiments, user interface 500 may be arranged to enable users to modify or adjust the specification information for table view 516 by interacting with shelf panel 504. For example, adding column fields to shelf panel 504 may result in columns that correspond to the additional data fields being added to table view 516. Likewise, removing column fields from shelf panel 504 may result in the removal of columns that correspond to the removed column fields.

Also, in some embodiments, users may be enabled to employ shelf panel 504 to set or modify various view features, such as, foreground color, mark type, or the like, by interacting with user interface 500 or shelf panel 504. In some embodiments, one or more modifications made via shelf panel 504 may result in changes to specification information associated with table view 516.

Likewise, in some embodiments, user interface 500 may enable users to interact with table view 516 to make one or more changes to the specification information for table view 516. For example, users may be enabled to change the column order of table view 516 by dragging columns to different positions using various input devices, such as, as computer mice, track balls, touchscreens, keyboard inputs, voice commands, or the like. Also, in some embodiments, user interface 500 may enable users to perform various other operations that may be employed to manipulate table-like views, such as, sorting by clicking on columns headers, or the like. Accordingly, in some embodiments, specification information for a table view may be modified via shelf panels or by direct interaction with table views or other user interface elements.

Figure 6:
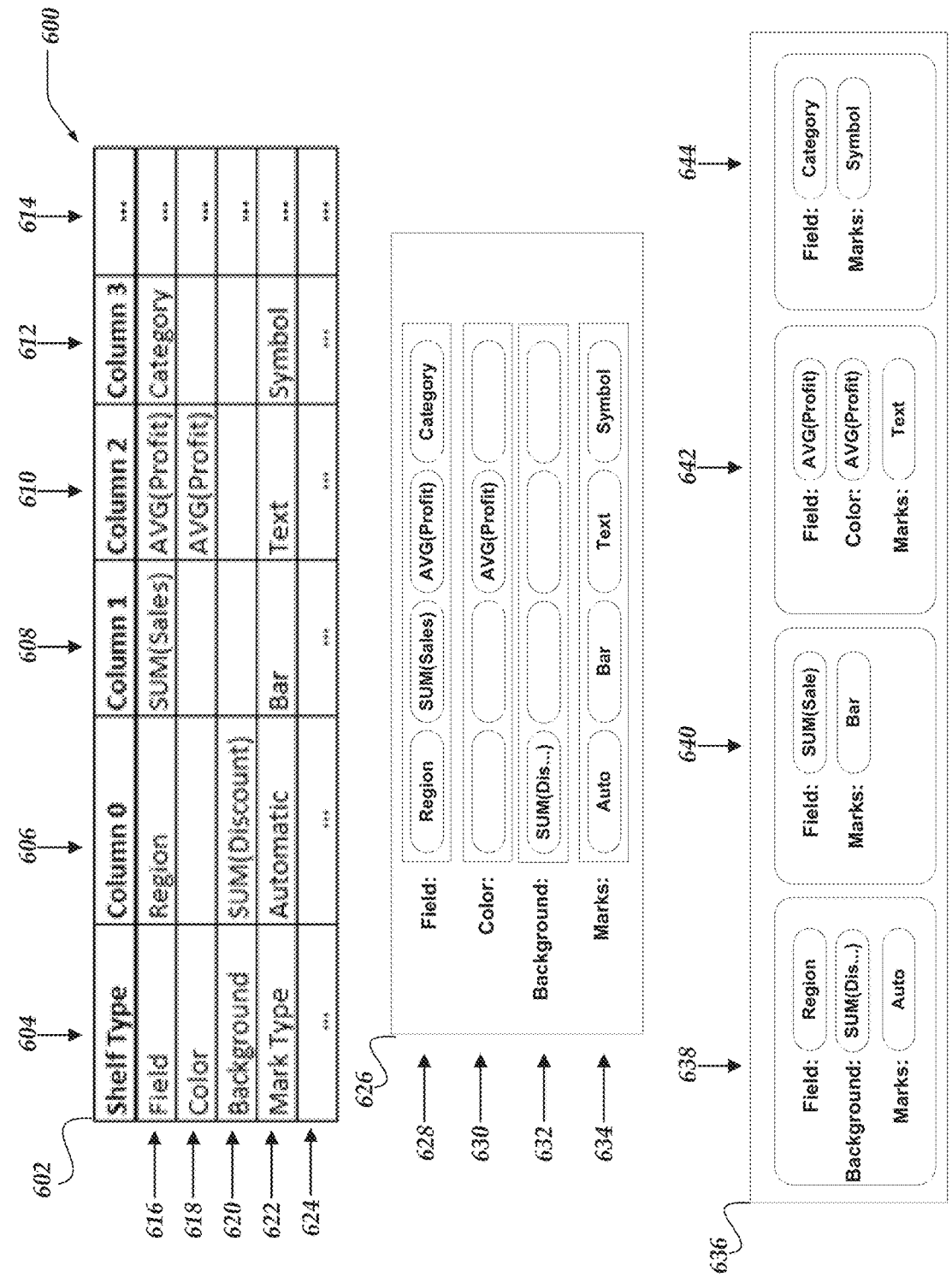
FIG. 6 illustrates logical schematics for representing specification information for a table view for flexible table based visualizations in accordance with one or more of the various embodiments.

FIG. 6 illustrates logical schematics for representing specification information 600 for a table view for flexible table based visualizations in accordance with one or more of the various embodiments. Shelf panels were introduced above, here FIG. 6 is used for disclosing additional detail for shelf panels or specification information in accordance with one or more of the various embodiments.

In one or more of the various embodiments, table view specification 602 may be arranged to store specification information for a table view. In this example, table view specification 602 is shown a being a table, however one of ordinary skill in the art will appreciate that other formats or data structures may be used without departing from the scope of the innovations disclosed herein, including text files, JSON files, database tables, XML, CSV, arrays, sparse arrays/matrices, lists, or the like. Similarly, in this example, attributes of the specification information are shown as being embedded in table view specification 602, however, one of ordinary skill in the art will appreciate that one or more of the specification attribute values may be represented using references or links to other data structures or data stores. In some embodiments, visualization engines may be arranged to expand or reduce table view specifications based on user interaction or the execution of one or more rules or instructions.

In one or more of the various embodiments, table view specification 602 includes one or more rows that may be associated with one or more shelf rows in a shelf panel. In this example, table view specification 602 includes, shelf type column 604, as well as, additional columns that may represent columns that hold specification information associated with column fields associated with a table view. In this example, column 606, column 608, column 610, column 612, represent four columns that may be included a table view where each column is associated with a column field from a data source or data model. In some embodiments, table view specifications may be dynamically expanded (or reduced) as column fields may be added or removed from table view specification (e.g., adding or removing data fields via a shelf panel). Accordingly, in this example, column 614 represents that capability to add (or remove) columns from a table view specification.

In one or more of the various embodiments, each row in table view specifications, such as, table view specification 602, may represent column fields or view features that are part of a table view specification. In this example: row 616 stores column field identifiers; row 618 defines the foreground color information for the table view columns; row 620 defines the background color information for the table view columns; row 622 defines the mark type for the table view columns; or the like. Here, row 624 represents that a table view specification may be configured include more (or fewer) view features than described here.

As described above, user interfaces may include shelf panels that enable users to define specification information for table views. As column fields or view features are added to a table view specification, they may be displayed in a shelf panel, such as, shelf panel 626.

In one or more of the various embodiments, shelf rows, such as, shelf row 628, shelf row 630, shelf row 632, shelf row 634, or the like, may represent data fields or view features of a table view specification.

In this example, shelf panel 626 corresponds to table view specification 602. Accordingly, shelf row 628 includes the same column fields shown in row 616 of table view specification 602. Similarly: shelf row 630 represents the foreground colors that are associated with the column fields; shelf row 632 represents the background colors that are associated with the column fields; shelf row 634 represents the type of marks associated with the column fields; or the like. In some embodiments, marks or mark types may represent how values for data items may be displayed in a table view. For example, a mark type of Text, indicates that the data item values should be displayed using text, text semantics, or text formatting rather than numerical formatting, date-time formatting, symbols, images, or the like.

In one or more of the various embodiments, visualization engines may be arranged to expand table view specifications or shelf panels as view features are included in a table view specification. As described above, shelf panels may be configured to include one or more default view feature rows, such as, color, mark type, or the like. In one or more of the various embodiments, visualization engines may be arranged to support a variety of additional view features. Some examples of additional view features may include, filter features, column field/column grouping features, in cell micro-visualizations, or the like. In this example, the view feature background color, represented here by shelf row 632 may be considered an additional or optional feature that may have been configured for a particular table view specification.

In one or more of the various embodiments, visualization engines may be arranged to use the position (e.g., column 0, column 1, or the like) of a column field in table view specification to determine the order that table view columns may be displayed. Similarly, in some embodiments, as table view columns may be interactively re-ordered, the visualization engine may be arranged to update the table view specification to match the table view columns as displayed in the display panel.

In one or more of the various embodiments, table view specifications may be configured to include functions, or the like, that may be executed to compute values for the data items that may be displayed in the table view. In some embodiments, these functions may be selected from a set of predefined functions, such as, sum, average, count, upper case, truncate, trim, or the like. In one or more of the various embodiments, visualization engines may be arranged to provide built-in support for one or more categories of functions, such as, math functions, statistical functions, text/string functions, financial functions, date or time functions, or the like. Further, in some embodiments, visualization engines may be arranged to support custom functions that may be comprised of other built-in or other custom functions.

In one or more of the various embodiments, view features in table view specifications may be configured based on one or more data objects from the data source. In some cases, the data objects may be the same objects associated with the column fields. In other cases, one or more data objects may be other objects from the data source rather than data objects associated with column fields included in the table view specifications.

In this example, row 616 at column 608 of table view specification 602 represents that the sum of sales is to be included in the table view. Similarly, in this example, row 616 at column 610 represents that the average profit is to be included in the table view.

In one or more of the various embodiments, functions may be included in more than one view feature for a given column field. Accordingly, in some embodiments, the functions may determine how a view feature behaves or appears in the table view. The impact or effect of a function on a view feature may vary depending on the view feature. In this example, the color feature associated with AVG(Profit) (row 618, column 610) represents that the foreground color used to display the average profit value may vary depending on the value computed for the average profit represented by each row in the table view. Not shown in this example is the default or selected palette of colors that the visualization engine may be configured to employ.

Similarly, in this example, row 620 at column 606 represents that the background color for the data item in the Region column may be determined based on the sum of Discounts applied to sales in each region. In this example, the background color view feature is based on a data object (Discount) that is not a column field in the table view specification.

Further, in some embodiments, table view specifications may define the type of mark that may be employed to represent data items in the table view. In this example, row 622 represents mark types that may be used for displaying data items values in the table view. Accordingly, in this example: values for the Region column field (column 606) may be represented using a default mark type; values for the SUM(Sales) column field (column 608) may be represented using a minified bar graph; values for the AVG(Profit) column field (column 610) may be represented using a text; and values for the Category column field (column 6612) may be represented using symbols.

In one or more of the various embodiments, visualization engines may be arranged to generate shelf panels, such as, shelf panel 636, where each column field may be represented by field cards that show the table view specification information for each column field. In this example, field card 638 includes the view features associated with the Region column field, field card 640 includes the view features associated with the SUM(Sales) column field, field card 642 includes the view features associated with the AVG(Profit) column field, and field card 644 includes the view features associated with the Category column field. Also, in some embodiments, the order of the field cards may correspond to the order the visualization engine may arrange table view columns in the table view.

Figure 7:
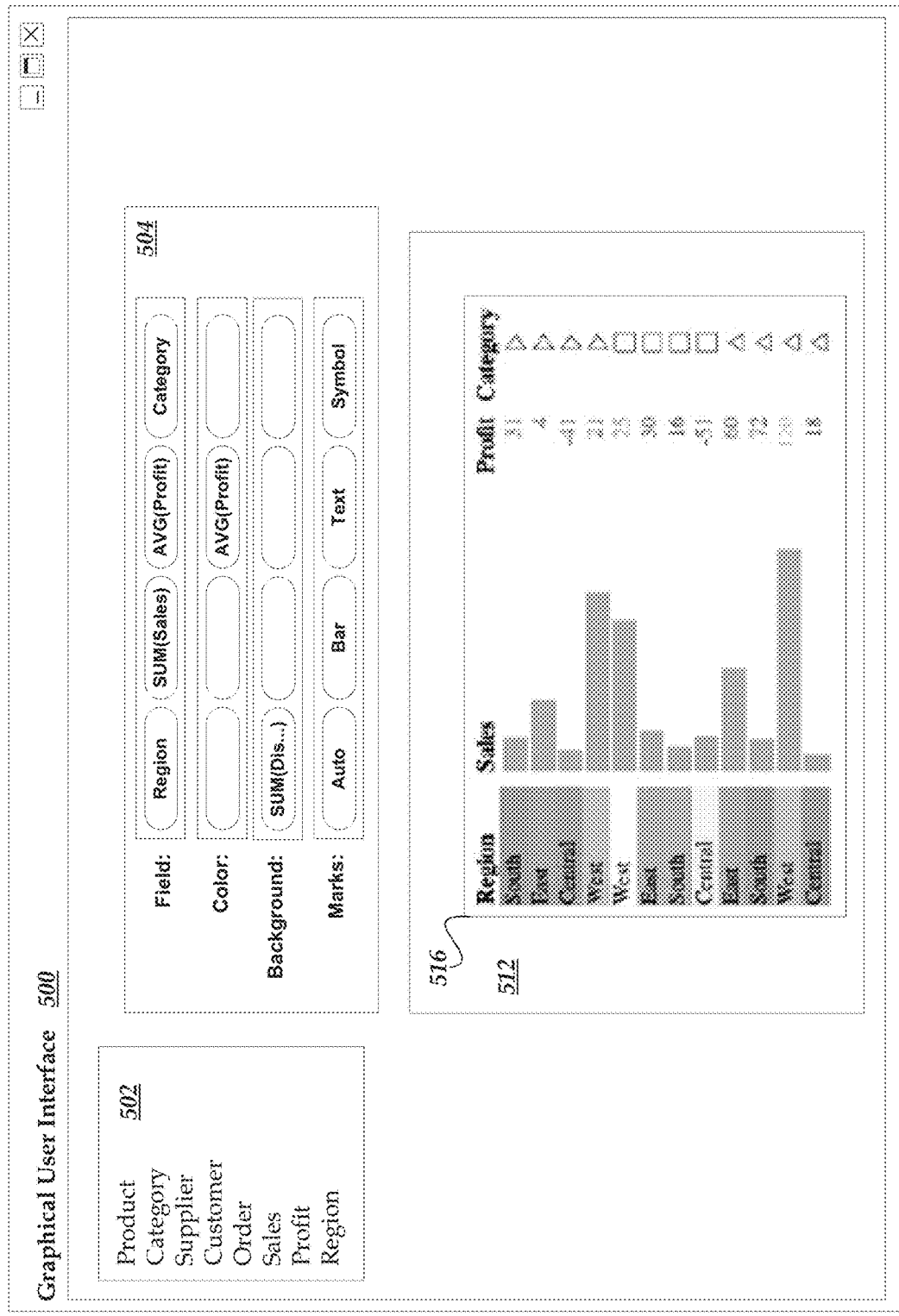
FIG. 7 illustrates a logical representation of a portion of a user interface for flexible table based visualizations in accordance with one or more of the various embodiments.

FIG. 7 illustrates a logical representation of a portion of user interface 500 for flexible table based visualizations in accordance with one or more of the various embodiments. For brevity and clarity, elements or behaviors of user interface 500 described above for FIG. 5A, FIG. 5B, or FIG. 5C are not repeated here.

In this example, table view 516 represents a table view that incorporates view features defined or represented in shelf panel 504. Accordingly, in this example, the background colors for the Region data items varies depending on the sum of the discount for each region. Likewise, the value for the Sales data items is represented using a bar graph, AVG(Profit) is represented using text, and Category is represented using symbols. Further, table view 516 provides illustrates how table view authors may define or style column labels independently how they may appear in the shelf panel. In this example, the column labels for table view 516 omits the aggregate function notation (SUM or AVG).

Generalized Operations

FIGS. 8-17 represent generalized operations for flexible table based visualizations in accordance with one or more of the various embodiments. In one or more of the various embodiments, processes 800, 900, 1000, 1100, 1200, 1300, 1400, 1500, 1600, and 1700 described in conjunction with FIGS. 8-17 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-17 may be used for flexible table based visualizations in accordance with at least one of the various embodiments or architectures such as those described in conjunction with FIGS. 4-7. Further, in one or more of the various embodiments, some or all of the actions performed by processes 800, 900, 1000, 1100, 1200, 1300, 1400, 1500, 1600, and 1700 may be executed in part by modeling engine 322 or visualization engine 324 running on one or more processors of one or more network computers.

Figure 8:
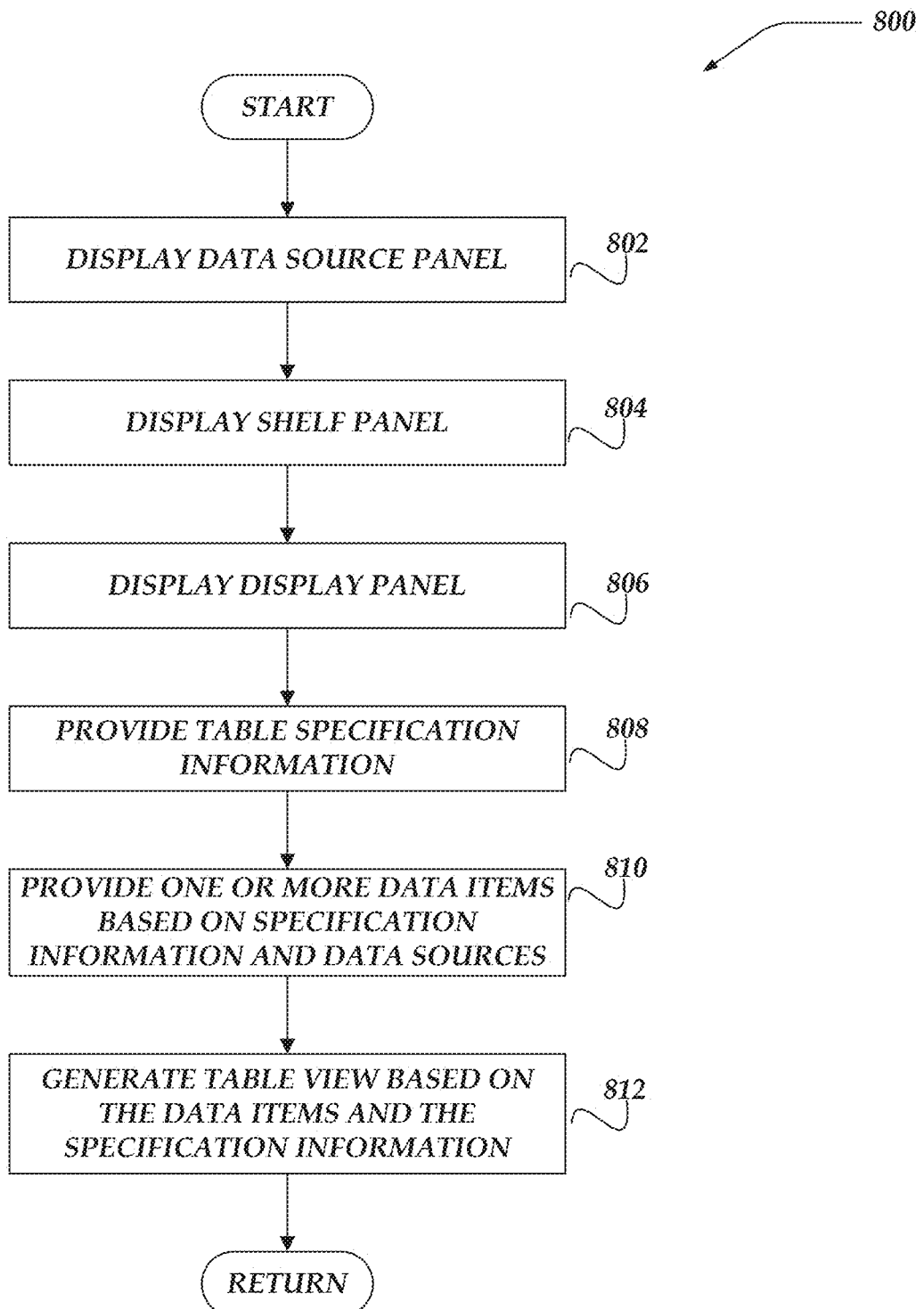
FIG. 8 illustrates an overview flowchart of a process for flexible table based visualizations in accordance with one or more of the various embodiments.

FIG. 8 illustrates an overview flowchart of process 800 for flexible table based visualizations in accordance with one or more of the various embodiments. After a start block, at start block 802, in one or more of the various embodiments, a visualization engine may be arranged to display a data source panel. As described above, visualization engines may be arranged to generate one or more panels in an interactive user interface. The layout of the panels may vary depending on local requirements or configuration information. In some embodiments, one or more panels may be combined. Similarly, in some embodiments, one or more panels may be divided into two or more panels.

In one or more of the various embodiments, data panels provide a user interface that enable users to select column fields from a data source or data model to include in a table view specification.

At block 804, in one or more of the various embodiments, the visualization engine may be arranged to display a shelf panel. As described above, shelf panels provide a user interface that enables users to create, modify, or view table view specifications.

At block 806, in one or more of the various embodiments, the visualization engine may be arranged to display a display panel. As described above, visualization engines may be arranged to employ display panels to display of interactive visualizations, such as, table views At block 808, in one or more of the various embodiments, the visualization engine may be arranged to provide table specification information. As described above, table view specifications define the data or layout for table views. Accordingly, in some embodiments, existing table views may be associated with a table view specification. In some embodiments, visualization engines may be arranged to employ an identifier associated with a table view to retrieve its table view specification from a data store.

In some embodiments, table view specifications may be unavailable for new table views. Accordingly, in some embodiments, visualization engines may be arranged to generate table view specifications for new table views. In some embodiments, visualization engines may be arranged to employ templates or rules provided via configuration information to generate initial table view specifications for new table views.

At block 810, in one or more of the various embodiments, the visualization engine may be arranged to provide one or more data items based on the specification information and one or more data sources. As described above, table view specifications include one or more column fields that may be associated data objects in a data source or data model. Accordingly, in some embodiments, visualization engines may be arranged to execute one or more queries or requests to retrieve the data items corresponding to the column fields included in the table view specification. In some embodiments, visualization engines may be arranged to generate query expressions or query clauses based on the column fields or view features in a table view specification. Accordingly, in one or more of the various embodiments, visualization engines may be arranged to employ rules, grammars, or the like, provided via configuration information to map column fields or view features included in table view specifications to query information that may be provided to a data source to obtain the data items.

At block 812, in one or more of the various embodiments, the visualization engine may be arranged to generate a table view based on the data items and the specification information. In one or more of the various embodiments, visualization engines may be arranged to interpret the table view specification to generate the visualization objects that may be included in the table view. Further, in some embodiments, the data items may be employed to populate the table rows displayed in the table view.

Next, in one or more of the various embodiments, control may be returned to a calling process.

Figure 9:
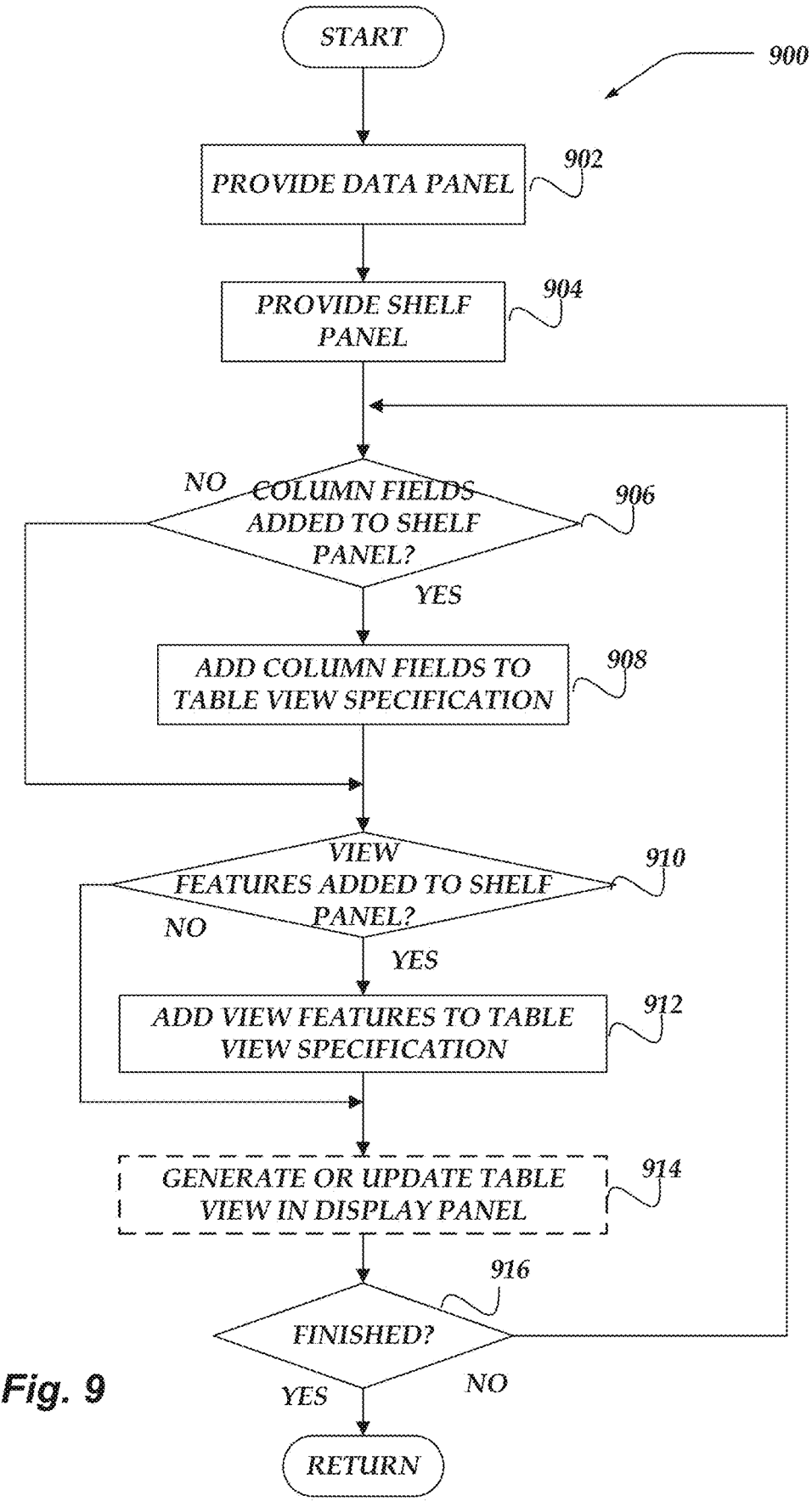
FIG. 9 illustrates a flowchart of a process for flexible table based visualizations in accordance with one or more of the various embodiments.

FIG. 9 illustrates a flowchart of process 900 for flexible table based visualizations in accordance with one or more of the various embodiments. After a start block, at start block 902, in one or more of the various embodiments, a visualization engine may be arranged to display a data source panel. At block 904, in one or more of the various embodiments, the visualization engine may be arranged to provide a shelf panel.

At decision block 906, in one or more of the various embodiments, if one or more column fields may be added to the shelf panel, control may flow to block 908; otherwise, control may flow to decision block 910. As described above, shelf panels and data panels enable users to select data objects from the data panel to add as column fields to the shelf panel. In some embodiments, the mechanism employed for selecting column fields may vary depending on the configuration of the visualization engine. In some embodiments, users may be enabled to select individual data objects using a pointing device (or touch screen) and 'drag' them into the field shelf row of a shelf panel. In some embodiments, visualization engine may be arranged to support other selection mechanisms, including, keyboard entry, voice commands, hot keys, or the like. In some embodiments, visualization engines may be arranged to employ one or more rules or instructions provided by via configuration information to automatically select one or more data objects that may be included as column fields.

At block 908, in one or more of the various embodiments, the visualization engine may be arranged to add one or more column fields to the table view specification. As described above, in some embodiments, visualization engines may be arranged to automatically add column fields to table view specifications based on the column fields defined by the Field shelf row of a shelf panel.

Accordingly, column fields that are added to the Field shelf row of a shelf panel may be added to the table view specification. Likewise, column fields that may be removed from the Field shelf row may be removed from the table view specification.

At decision block 910, in one or more of the various embodiments, if one or more view features may be added to the shelf panel, control may flow to block 912; otherwise, control may flow to block 914. As described above, table view specifications support various view features. Accordingly, in some embodiments, users may be enabled to select view features using a variety of user interfaces. In some embodiments, the available view features may be context sensitive. In some embodiments, visualization engines may be arranged to automatically present available view features based on the context of the operation. In some embodiments, visualization engines may be arranged to present various user interfaces, such as, menus, pop-up menus, tooltips, or the like, that may show the available view features. Similarly, visualization engines may be arranged to automatically present user interfaces that enable users to select parameters for view features if available. For example, if a user is adding a background color view feature, the visualization engine may automatically present a color picker user interface that enables the user to select the background color.

Also, in one or more of the various embodiments, many view features may be associated with column fields or data objects that determine how the view features appear or otherwise affect the table view. Accordingly, in some embodiments, visualization engines present user interfaces that enable users to select the one or more data object that may be associated with a view feature.

Likewise, in some embodiments, view features may be associated with one or more functions that may determine how the view feature may be applied the associated data objects. Accordingly, in some embodiments, visualization engines may be arranged to present user interfaces that enable users to add one or more functions to a view feature. In some embodiments, the one or more functions may be selected or filtered based on context information, such as, the data type of the associated data objects, relationships between data objects and the data field, or the like. For example, if the data type of the data object is numerical, aggregate/statistical functions may be presented, such as, SUM, AVG, or the like. In contrast, for example, if the data type is categorical or discrete, functions such as COUNT may be presented while functions such as SUM or AVG may be excluded. Accordingly, in some embodiments, visualization engines may be arranged to employ rules or instructions provided via configuration information to determine the available functions, parameters, or view features that may be available in a given context.

At block 912, in one or more of the various embodiments, the visualization engine may be arranged to add the one or more view features to the table view specification. As described above, visualization engines may be arranged to generate table view specification entries based on view features added to the shelf panel.

At block 914, in one or more of the various embodiments, optionally, the visualization engine may be arranged to generate or update a table view in a display panel. In one or more of the various embodiments, each change to a table view specification may require the automatically visualization engine to generate or update a table view that is displayed in the display panel. In some embodiments, as the table view specification for a table view is modified, visualization engines may automatically update the table view in the display panel. Accordingly, in some embodiments, users may immediately observe the effect of the view features on the table view.

Note, this block is marked as optional, because in some cases, column fields or view features may not have been added to the table view specification. Accordingly, if a table view was previously generated it may not need to be updated or otherwise re-displayed.

At decision block 916, in one or more of the various embodiments, if no more column fields or view features may be added to the table view specification, control may be returned to a calling process; otherwise, control may loop back to decision block 906. Next, in one or more of the various embodiments, control may be returned to a calling process.

Figure 10:
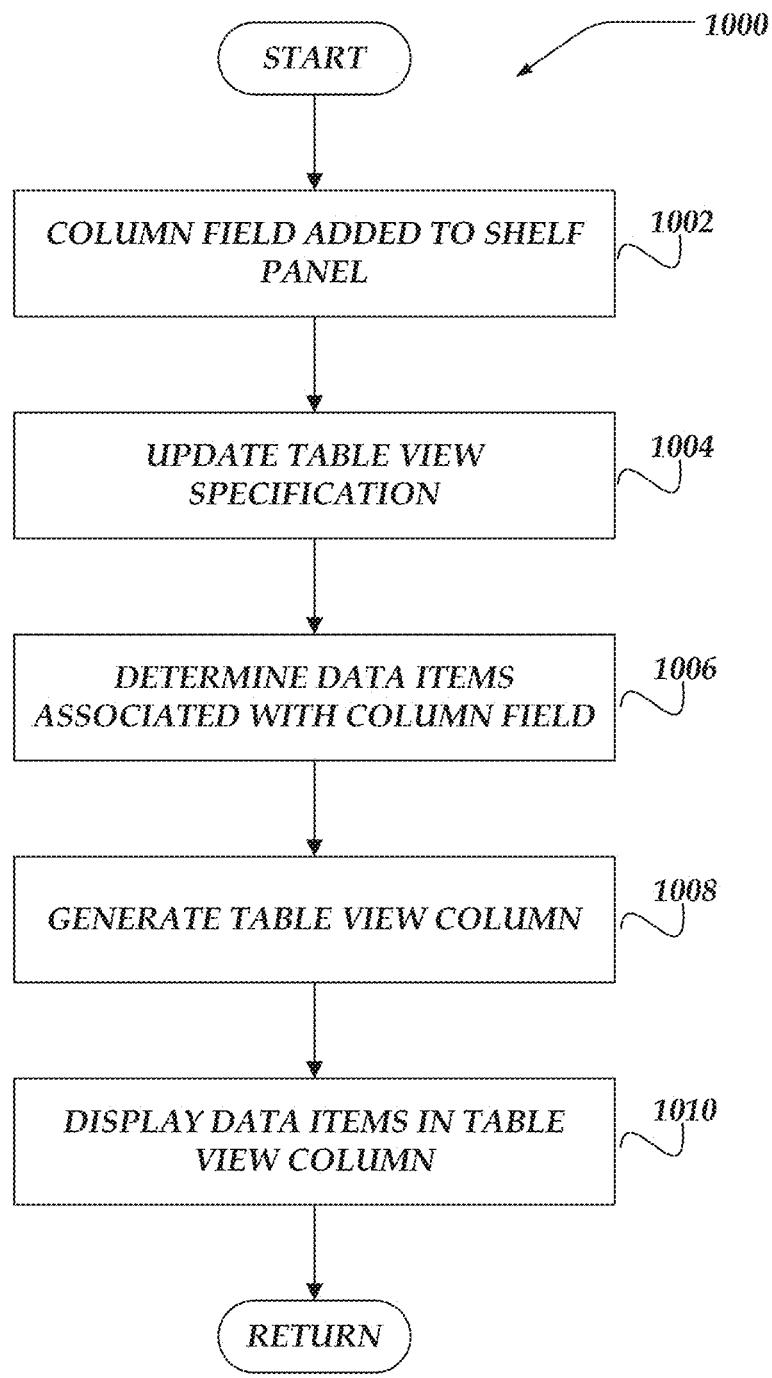
FIG. 10 illustrates a flowchart of a process for adding data fields to a table view for flexible table based visualizations in accordance with one or more of the various embodiments.

FIG. 10 illustrates a flowchart of process 1000 for adding column fields to a table view for flexible table based visualizations in accordance with one or more of the various embodiments. After a start block, at start block 1002, in one or more of the various embodiments, a visualization engine may be arranged to add a column field to a shelf panel. As described above, users may be enabled to select data objects to add as column fields to a shelf panel. In some embodiments, users may determine a position in a Field shelf row to place the column field. Accordingly, in some embodiments, column fields may be placed in front, behind, or in between other column fields that may be in the Field shelf row.

At block 1004, in one or more of the various embodiments, the visualization engine may be arranged to update the table view specification. As column fields are added to the Field shelf row, the visualization engine may automatically update the table view specification to include the added column fields. Similarly, as column fields are removed from a shelf panel, the visualization engine may automatically update to table view specification to remove the removed data fields.

At block 1006, in one or more of the various embodiments, the visualization engine may be arranged to determine one or more data items associated with the column field. In one or more of the various embodiments, column fields may correspond to a data objects in a data source. Accordingly, in some embodiments, the visualization engine may be arranged to query the data source to obtain the data items associated with the column field. In some embodiments, data obtained from the data source may be transformed or otherwise processed based on the data field definition. For example, a column field may be defined to be a SUM of an item. Alternatively, in some embodiments, the visualization engine may be arranged to include some of the specified functions (e.g., SUM, AVG, COUNT, or the like) in its query such that the data source performs the requested operations before providing the data items to the visualization engine.

At block 1008, in one or more of the various embodiments, the visualization engine may be arranged to generate a table view column based on the table view specification and the data items. As described above, in some embodiments, data fields may be associated with table view columns. Thus, in some embodiments, as column fields may be added to a Field shelf row, table view columns may be added to table views.

In one or more of the various embodiments, the position of the generated table view column in the table view may be based on the position of its corresponding column field in the field shelf row.

At block 1010, in one or more of the various embodiments, the visualization engine may be arranged to display data items in the table view column. As described above, the visualization engine may be arranged to fill the table view with values that may be based on the data items. The particular styling, formatting, or the like, for the data items may be determined based on the view features included in the table view specification.

Next, in one or more of the various embodiments, control may be returned to a calling process.

Figure 11:
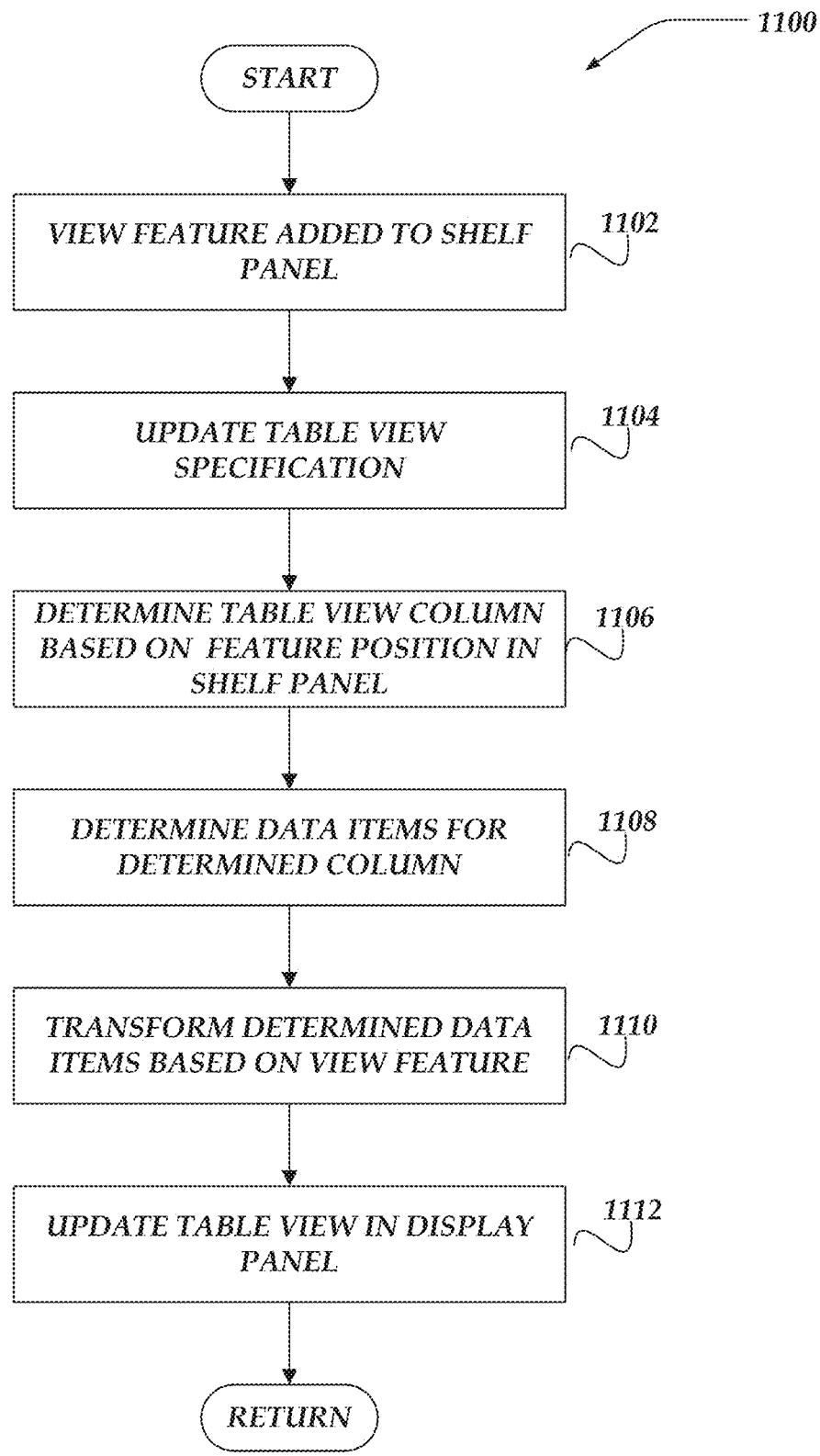
FIG. 11 illustrates a flowchart of a process for adding view features to table view specifications for flexible table based visualizations in accordance with one or more of the various embodiments.

FIG. 11 illustrates a flowchart of process 1100 for adding view features to table view specifications for flexible table based visualizations in accordance with one or more of the various embodiments. After a start block, at start block 1102, in one or more of the various embodiments, a visualization engine may be arranged to add a view feature to a shelf panel. As described above, visualization engine may be arranged to enable users to select view features to add (or remove) from one or more view feature shelf rows in the shelf panel.

In one or more of the various embodiments, one or more view features may be added to the shelf panel by default. In some embodiments, table view specifications may be initialized based on template, or the like, that includes one or more view features by default. Thus, in some embodiments, as column fields may be added to a shelf panel, one or more default view features may be automatically added as well. In some embodiments, view feature defaulting rules may vary depending on local requirements or local circumstances. Accordingly, in some embodiments, visualization engines may be arranged to employ configuration information to determine the default view features.

At block 1104, in one or more of the various embodiments, the visualization engine may be arranged to update the table view specification based on the added view feature. In one or more of the various embodiments, visualization engines may be arranged to automatically update table view specifications as view features are added to the shelf panel. Similarly, in some embodiments, visualization engines may be arranged to automatically remove view features from table view specifications as view features are removed from the shelf panel.

At block 1106, in one or more of the various embodiments, the visualization engine may be arranged to determine a table view column in the table view based on the position in the shelf row or the table view specification. In one or more of the various embodiments, view features may be associated with data fields based on their position in the shelf panel. For example, in some embodiments, if the view feature is a placed in the second position in the view feature shelf row, the view feature may be associated with the column field in the second position of the Field shelf row. Similarly, in some embodiments, if a 'card' based shelf panel user interface is employed, the view feature may be associated with a column field based on the shelf panel card that the view feature is placed in.

In one or more of the various embodiments, if one or more column fields are removed from a shelf panel or table view specification, visualization engines may be arranged to automatically remove the one or more view features associated with the removed column fields from the shelf panel or table view specification as well.

At block 1108, in one or more of the various embodiments, the visualization engine may be arranged to determine one or more data items for the determined table view column. In one or more of the various embodiments, column fields may correspond to a data objects in a data source. Accordingly, in some embodiments, the visualization engine may be arranged to query a data source to obtain the data items associated with the table view column associated with the view features. In some embodiments, data obtained from the data source may be transformed or otherwise processed based on the column field definition. For example, a column field may be defined to be a SUM of a item. Alternatively, in some embodiments, the visualization engine may be arranged to include some the specified functions (e.g., SUM, AVG, COUNT, or the like) in its query such that the data source performs the requested transformations before providing the data items to the visualization engine.

At block 1110, in one or more of the various embodiments, the visualization engine may be arranged to transform the determined data items based on the view feature and the table view specification. As described above, view features may define various transforms that may be applied to data items before including them in a table view. In some embodiments, visualization engines may be arranged to employ configuration information to determine the particular operations to perform to apply view features to column fields. In some embodiments, one or more view features may be built-in while one or more view features based on customized instructions that may be defined by users or visualization authors.

At block 1112, in one or more of the various embodiments, the visualization engine may be arranged to update the table view in the display panel. As view features are added, removed, or modified, visualization engines may automatically update the table view displayed in the display panel. Accordingly, in some embodiments, as users add or remove view features, the visualization engine automatically updates the table view enabling the users to see the effect that the added (or removed) view features have on the appearance of the table view.

Next, in one or more of the various embodiments, control may be returned to a calling process.

Figure 12:
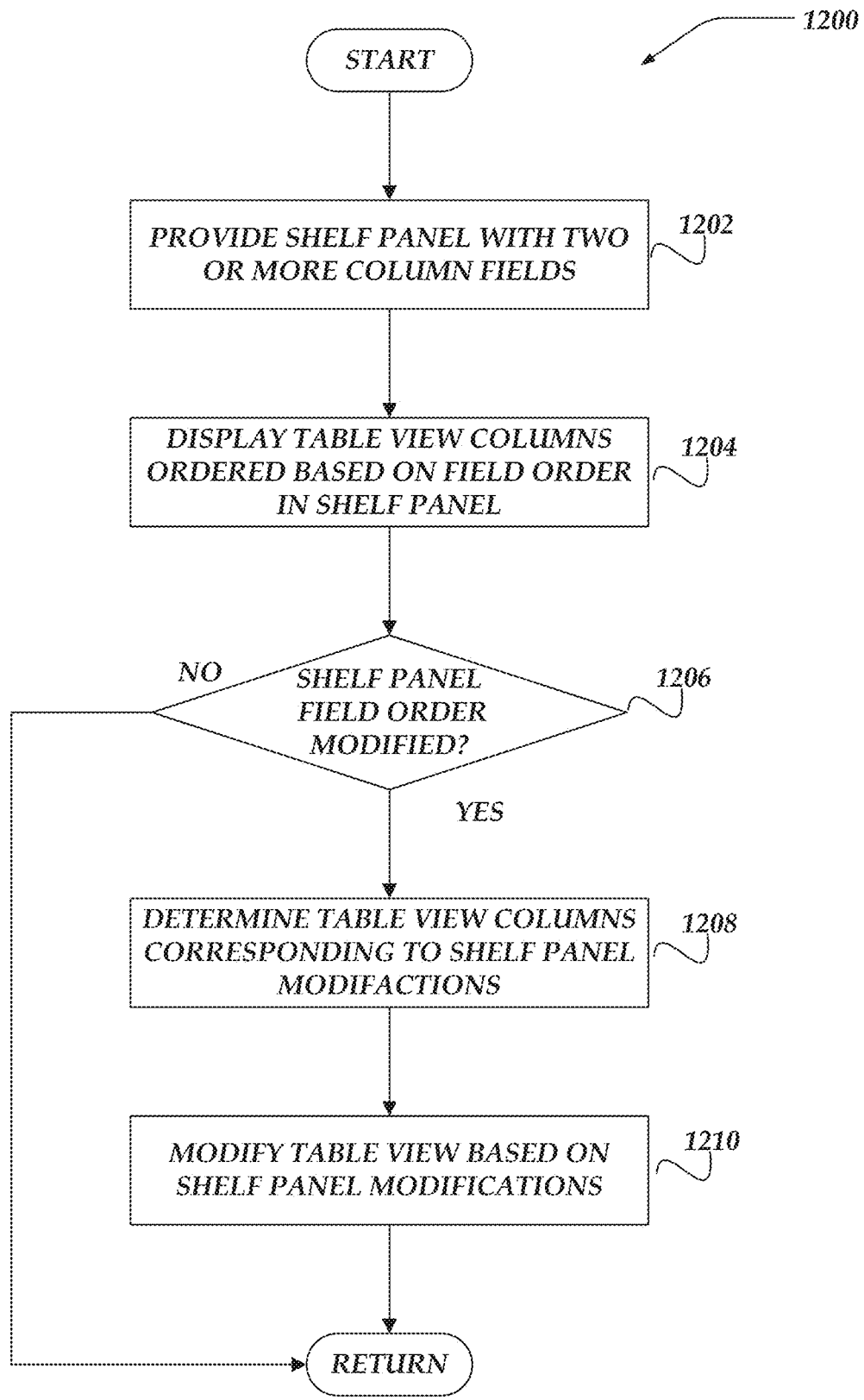
FIG. 12 illustrates a flowchart of a process for modifying table view specifications based on direct manipulation of a table view for flexible table based visualizations.

FIG. 12 illustrates a flowchart of process 1200 for modifying table view specifications based on direct manipulation of a table view for flexible table based visualizations in accordance with one or more of the various embodiments. After a start block, at start block 1202, in one or more of the various embodiments, a visualization engine may be arranged to provide a shelf panel that includes two or more column fields.

At block 1204, in one or more of the various embodiments, the visualization engine may be arranged to display a table view with two or more table view columns that may be ordered based on the order of the column fields in the shelf panel. As described above, visualization engines may be arranged to generate at least one table view column for each column field in a table view specification. In some cases, some view features, such as, breakdown view features, breakup view features, or the like, may result in two or more columns per column field. See, breakdown view feature or breakup view feature use cases described below.

At decision block 1206, in one or more of the various embodiments, if the ordering of the column fields in the shelf panel may be modified, control may flow to block 1208; otherwise, control may be returned to a calling process. In some embodiments, visualization engines may be arranged to generate shelf panels that include one or more interactive elements or behaviors (e.g., dragging fields that have been selected using a point device, or the like) that enable the order of column fields in Field shelf rows to be changed.

At block 1208, in one or more of the various embodiments, the visualization engine may be arranged to determine the one or more table view columns that may correspond to the modifications to the shelf panel. As described above, data fields in shelf panels may correspond to table view columns based on their position in the Field shelf row. Accordingly, in some embodiments, if a user 'moves' a column field in a Field shelf row to another position, the original position of the moved column field may be employed to determine the table view columns that may be impacted by the move.

Further, in one or more of the various embodiments, data structures associated with column fields or the table view column may include references or identifiers that may link a table view column with its corresponding column field.

At block 1210, in one or more of the various embodiments, the visualization engine may be arranged to modify the table view based on the modifications to the shelf panel. In one or more of the various embodiments, the visualization engine may be arranged to modify the table view to reflect the updated positioning of the column fields in the shelf panel. Also, in one or more of the various embodiments, the visualization engine may be arranged to modify the table view specification to match the updated positioning of the column fields.

Next, in one or more of the various embodiments, control may be returned to a calling process.

Figure 13:
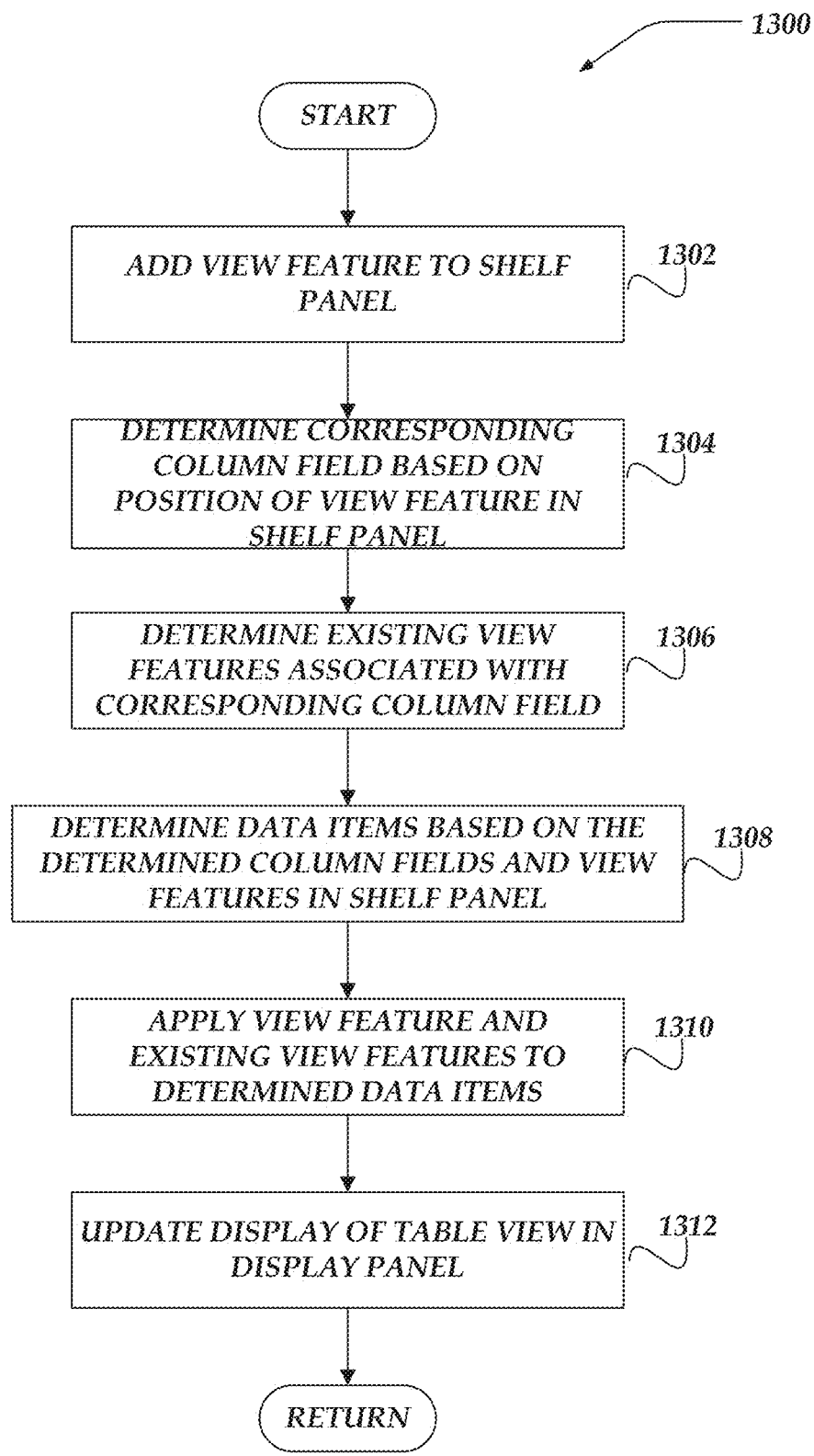
FIG. 13 illustrates a flowchart of a process for flexible table based visualizations in accordance with one or more of the various embodiments.

FIG. 13 illustrates a flowchart of process 1300 for flexible table based visualizations in accordance with one or more of the various embodiments. After a start block, at start block 1302, in one or more of the various embodiments, a visualization engine may be arranged to add a view feature to a shelf panel.

At block 1304, in one or more of the various embodiments, the visualization engine may be arranged to determine one or more corresponding column fields based on the position of the view feature in the shelf panel. In one or more of the various embodiments, the placement of the view feature in the shelf panel may determine its associated column field.

At block 1306, in one or more of the various embodiments, the visualization engine may be arranged to determine one or more existing view features that may be associated with the column field. As described above, in some embodiments, more than one view feature may be associated with each column field.

At block 1308, in one or more of the various embodiments, the visualization engine may be arranged to determine one or more data items based on the data fields and view feature in the shelf panel. As described above, visualization engines may be arranged to generate a query based on the column fields and the view features that may be employed to request data items from a data source. In some embodiment, visualization engines may be arranged to generate query expressions or query clauses based on the column fields or view features in a table view specification. Accordingly, in one or more of the various embodiments, visualization engines may be arranged to employ rules, grammars, or the like, provided via configuration information to map column fields or view features included in table view specifications to query information that may be provided to a data source to obtain the data items.

At block 1310, in one or more of the various embodiments, the visualization engine may be arranged to apply the added view feature and the one or more existing view features to the data items. In some embodiments, some view features may be related to styling or formatting of data items rather than being related to generating query information to obtain data items.

Accordingly, in some embodiments, visualization engines may render the data items in the display panel based on the view features associated with styling or formatting. Also, in some embodiments, one or more view features may be associated with grouping, sorting, filtering, or the like, of data items outside of the data source (or database). Accordingly, in some embodiments, visualization engines may be arranged to apply grouping, sorting, filtering, or the like, as defined by one or more view features to the data items before they are displayed in the table view.

In one or more of the various embodiments, one or more view features may define mini-visualizations (minified visualizations) that may be displayed in the a cell of a table view rather than represent data item values using a numbers, text, or symbols. For example, in some embodiments, a mark type view feature may include support for representing a value using a bar graph. Likewise, in some embodiments, other view features may represent a line plot of the data item value versus another metric or value. In some embodiments, the table view cells may contain a visualization that represents a formula or expression rather expressed over a range of values rather representing a single discreet value.

At block 1312, in one or more of the various embodiments, the visualization engine may be arranged to update the display of the table view in the display panel. In one or more of the various embodiments, one or more view features may affect one or more display characteristics of the table view. For example, a breakdown view feature (shown below) may introduce additional columns (sub-columns) that may be included in the table view.

Next, in one or more of the various embodiments, control may be returned to a calling process.

Figure 14:
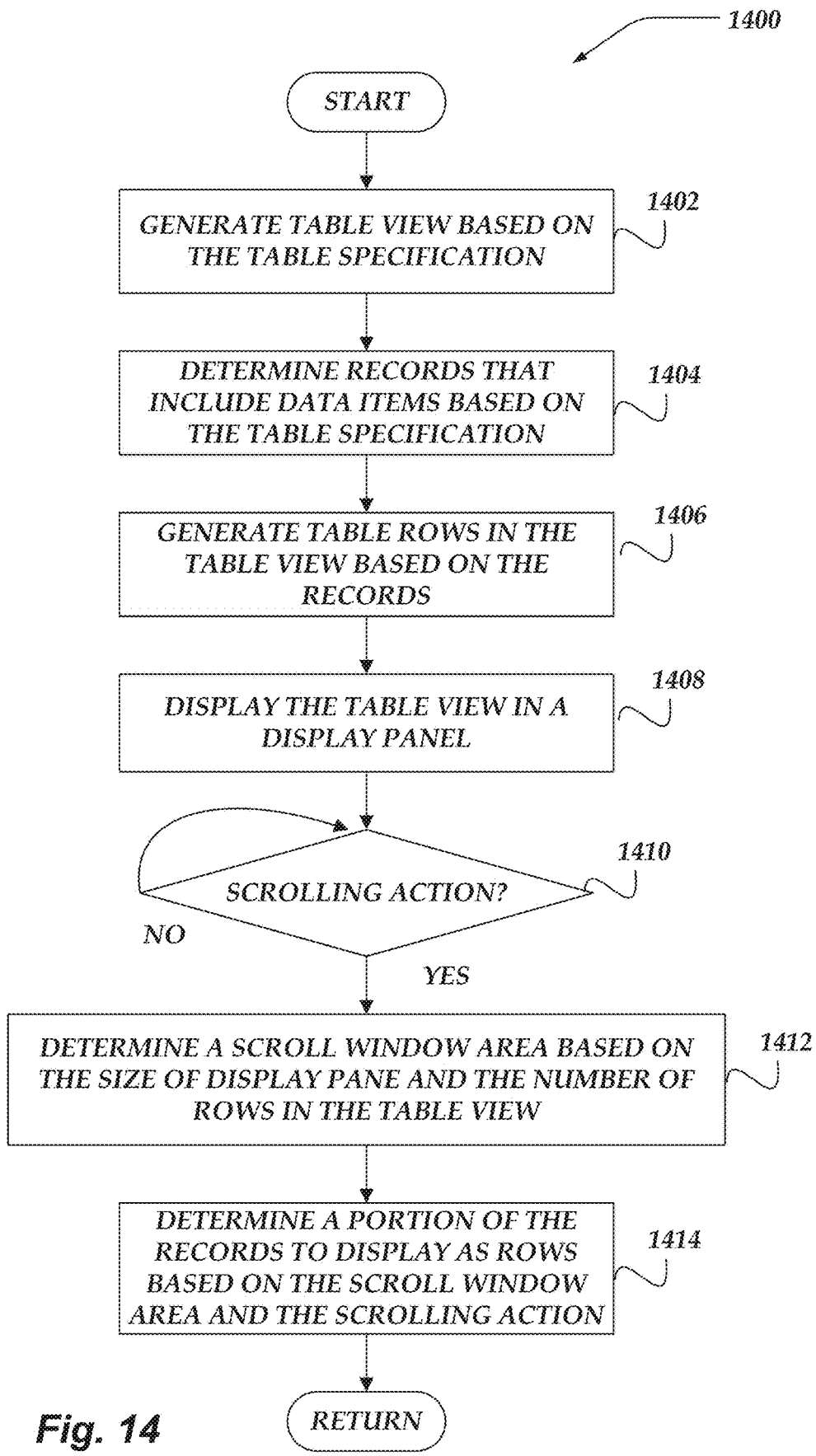
FIG. 14 illustrates a flowchart of a process for flexible table based visualizations that support table-like semantics or behavior in accordance with one or more of the various embodiments.

FIG. 14 illustrates a flowchart of process 1400 for flexible table based visualizations that support table-like semantics or behavior in accordance with one or more of the various embodiments. After a start block, at start block 1402, in one or more of the various embodiments, a visualization engine may be arranged to generate a table view based on a table view specification. As described above, table views may be interactive visualizations that conform to conventional table-like semantics or behavior. Accordingly, in some embodiments, table views may be arranged to enable users, scroll through the rows in a table view, rearrange column order, sort rows by clicking header or column labels, or the like. In one or more of the various embodiments, visualization engines may be arranged to maintain the record level associations between different data items (some from different data objects) that enable the row-like appearance or behavior.

At block 1404, in one or more of the various embodiments, visualization engines may be arranged to determine one or more records that include one or more date items based on the table specification. As described above, in some embodiments, visualization engines may be arranged to generate one or more queries, or the like, to retrieve data items from a data source. In some embodiments, the visualization engines may determine one or more queries or query expressions based on fields or features defined in table view specifications.

At block 1406, in one or more of the various embodiments, visualization engines may be arranged to generate one or more table rows in the table view based on the records of data items obtained in response to the one or more queries.

At block 1408, in one or more of the various embodiments, visualization engines may be arranged to display the table view in the display panel.

At decision block 1410, in one or more of the various embodiments, if a scrolling action occurs, control may flow to block 1412; otherwise, control may loop back to decision block 1410. In some embodiments, a scrolling action may include a user using a pointing device, touchscreen interface, or other user interface to indicate or influence which records are visible in a displayed table view. Note, one of ordinary skill in the art will appreciate that visualization engines may provide other user interfaces that may be employed to perform other table-like behavior, such as, sorting, rearranging columns, or the like. However, for brevity and clarity, explicit examples of these other table-like behaviors have been omitted.

At block 1412, in one or more of the various embodiments, visualization engines may be arranged to determine a scroll window area based on the size or geometry of the display panel, the number of rows of the table view, or the scrolling action. For example, if the size of the display panel enables 20 rows to be displayed in the table view, the scroll window area may be sized to display 20 rows.

At block 1414, in one or more of the various embodiments, visualization engines may be arranged to determine a portion of the records to display as rows in the table view based on the scroll window area and the scrolling action. For example, if the scroll action is an action to scroll down by one row, a record corresponding to the top row in the scroll window area may be hidden from view while another record is used to fill the bottom row in the scroll window area.

Next, in some embodiments, control may be returned to a calling process.

Figure 15:
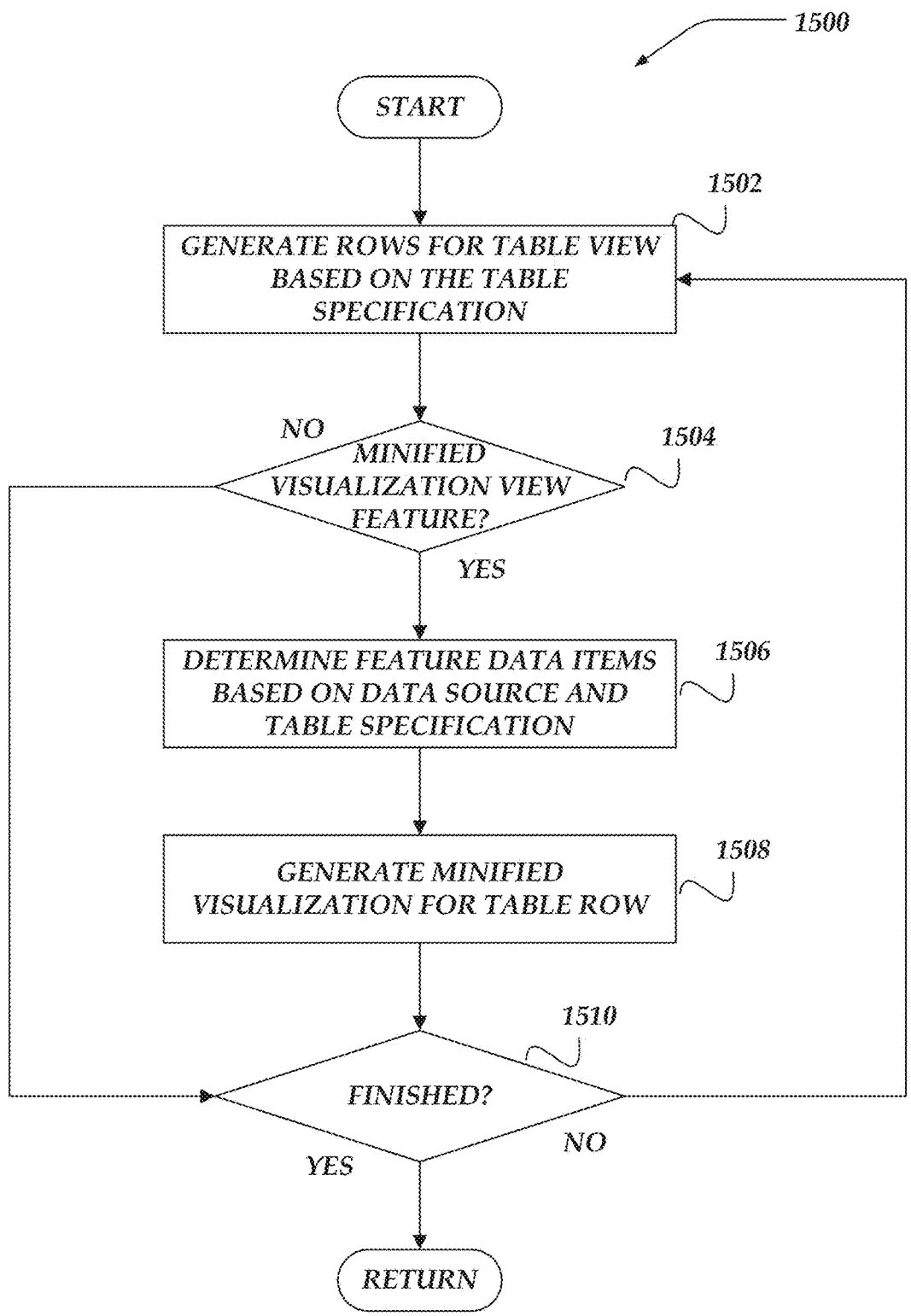
FIG. 15 illustrates a flowchart of a process for flexible table based visualizations that include view features such as minified visualizations in accordance with one or more of the various embodiments.

FIG. 15 illustrates a flowchart of process 1500 for flexible table based visualizations that include view features such as minified visualizations in accordance with one or more of the various embodiments. After a start block, at start block 1502, in one or more of the various embodiments, visualization engines may be arranged to generate one or more rows for table views based on table view specifications.

At decision block 1504, in one or more of the various embodiments, if a view feature corresponding to minified visualizations is included in a table view specification, control may flow to block 1506; otherwise, control may flow to decision block 1510.

At block 1506, in one or more of the various embodiments, visualization engines may be arranged to determine one or more feature data items based on the data source and the table view specification. In one or more of the various embodiments, the view features may include information for determine the type of minified visualization, the domain or range information, additional criteria, or the like. This information, including the associated column field information may be employed to generate a query, or the like, to obtain the data items associated with the minified visualization. In some embodiments, in some cases, each row of the table view may require a unique minified visualization. Accordingly, in some embodiments, visualization engines may be arranged to obtain separate or unique date items (feature data items) for each row.

In some embodiments, feature data items (data items for the minified visualization) may be determined for some or all of the records, including records that are not displayed in row. Thus, in some embodiments, if a record comes into view via scrolling actions, or the like, the feature data items may be immediately available to generate the minified visualization. In other embodiments, the minified visualizations for each record may be generated in advance. Thus, if a row corresponding to a given record is displayed in the display panel, the pre-generated minified visualization may be displayed.

At block 1508, in one or more of the various embodiments, visualization engines may be arranged to generate a minified visualization to include in the table view row.

At decision block 1510, in one or more of the various embodiments, if the rows for the table view have been displayed, control may be returned to a calling process; otherwise, control may loop back to block 1502 to continue generating rows for the table view.

Next, in some embodiments, control may be returned to a calling process.

Figure 16:
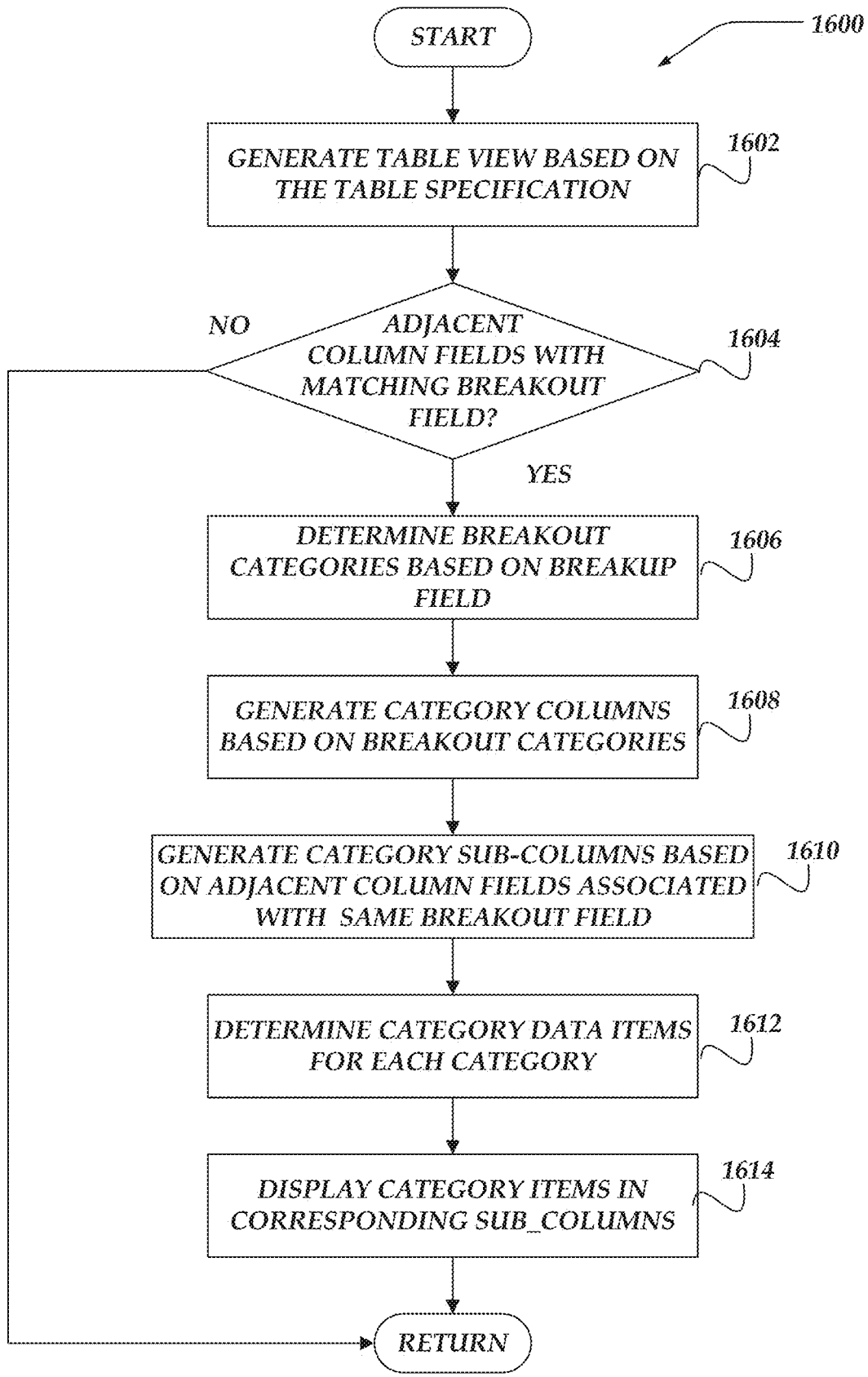
FIG. 16 illustrates a flowchart of a process for flexible table based visualizations that include breakout view features in accordance with one or more of the various embodiments.

FIG. 16 illustrates a flowchart of process 1600 for flexible table based visualizations that include breakout view features in accordance with one or more of the various embodiments. After a start block, at start block 1602, in one or more of the various embodiments, visualization engines may be arranged to generate table views based on table view specifications.

At decision block 1604, in one or more of the various embodiments, if the table view specification includes adjacent column fields that have the same breakout field, control may flow to block 1606; otherwise, control may be returned to a calling process.

At block 1606, in one or more of the various embodiments, visualization engines may be arranged to determine one or more breakout categories based on the breakout field. In some embodiments, the different categories may correspond to unique values of the breakout field. For example, if the breakout field is Shipping Method, each type of shipping method may be a breakout category.

At block 1608, in one or more of the various embodiments, visualization engines may be arranged to generate one or more category columns based on the breakout categories. In some embodiments, each category determined from the breakout field may have its own category column. For example, if the breakout field is Shipping Method and there are two shipping methods, such as, Air and Ground, one category column may be generated for Air and one category column may be generated Ground.

At block 1610, in one or more of the various embodiments, visualization engines may be arranged to generate one or more category sub-columns based on the table view specification. In some embodiments, a category sub-column may be generated for each adjacent column field that shares the same breakout field.

At block 1612, in one or more of the various embodiments, visualization engines may be arranged to determine one or more category data items for each category of a breakout field. In some embodiments, category data items may be comprised of the data items from the adjacent column fields that have the same breakout field. Accordingly, in some embodiments, the collection of category data items may include data items for two or more column fields. (See, FIG. 18).

At block 1614, in one or more of the various embodiments, visualization engines may be arranged to separate the category data items so they may be displayed in their corresponding category sub-columns. Next, in some embodiments, control may be returned to a calling process.

Note, in some embodiments, data sources or visualization engines may support various query languages, or the like, that enable one or more discreet steps detailed above to be performed at the same time. For example, visualization engines may be arranged to generate a single query that if executed produces a result set provides the data items for the category sub-columns.

Figure 17:
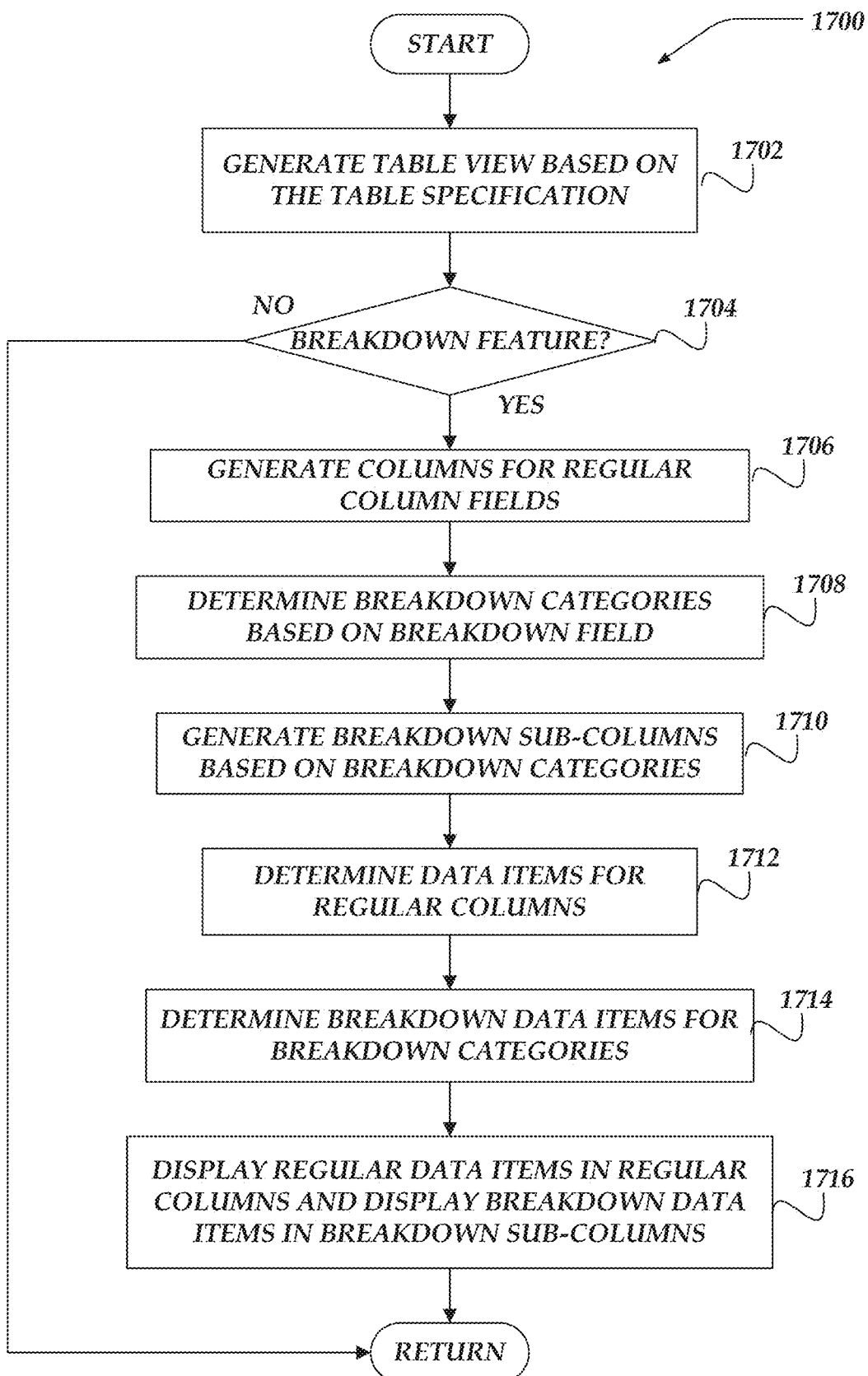
FIG. 17 illustrates a flowchart of a process for flexible table based visualizations that include breakdown view features in accordance with one or more of the various embodiments.

FIG. 17 illustrates a flowchart of process 1700 for flexible table based visualizations that include breakdown view features (breakdown features) in accordance with one or more of the various embodiments. After a start block, at start block 1702, in one or more of the various embodiments, visualization engines may be arranged to generate table views based on table view specifications.

At decision block 1704, in one or more of the various embodiments, if the table view specification includes breakdown field, control may flow to block 1706; otherwise, control may be returned to a calling process.

At block 1706, in one or more of the various embodiments, visualization engines may be arranged to generate one or more table columns in the table view for each regular column field. Regular column fields may column fields that may be unassociated with a breakdown field.

At block 1708, in one or more of the various embodiments, visualization engines may be arranged to determine one or more breakdown categories based on the breakdown fields. In some embodiments, the value of a breakdown field may correspond to the name or identifier of a data object field. In some embodiments, each distinct value of the data object field that matches a breakdown field may be determined to be a breakdown category.

At block 1710, in one or more of the various embodiments, visualization engines may be arranged to generate one or more breakdown sub-columns based on the one or more breakdown categories. In some embodiments, a given breakdown category may be associated with one or more sub-columns. In some embodiments, the number of sub-columns depends on the number of column fields that may be associated with the same breakdown field. For example, in FIG. 19, breakdown category Ground (e.g., reference number 1918) has two sub-columns (sub-column 1920 and sub-column 1922) because there are two column fields (column field 1910 and column field 1912) that have the same breakdown field.

At block 1712, in one or more of the various embodiments, visualization engines may be arranged to determine one or more data items for one or more regular columns. In some embodiments, the data items for the one or more regular columns may be determined normally.

At block 1714, in one or more of the various embodiments, visualization engines may be arranged to determine one or more breakdown data items for the one or more breakdown categories. In some embodiments, visualization engines may be arranged to execute a query for breakdown data items for each column field that is associated with a breakdown field. In the example, shown in FIG. 19, the breakdown data items may be determined for column field 1910 and column field 1912 because they are both associated with breakdown fields.

At block 1716, in one or more of the various embodiments, visualization engines may be arranged to display the one or more regular data items in the one or more regular columns in the table view. And, in some embodiments, visualization engines may be arranged to display one or more breakdown data items in the one or more breakdown sub-columns. See, FIG. 19.

Next, in some embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrative Use Cases

Figure 18:
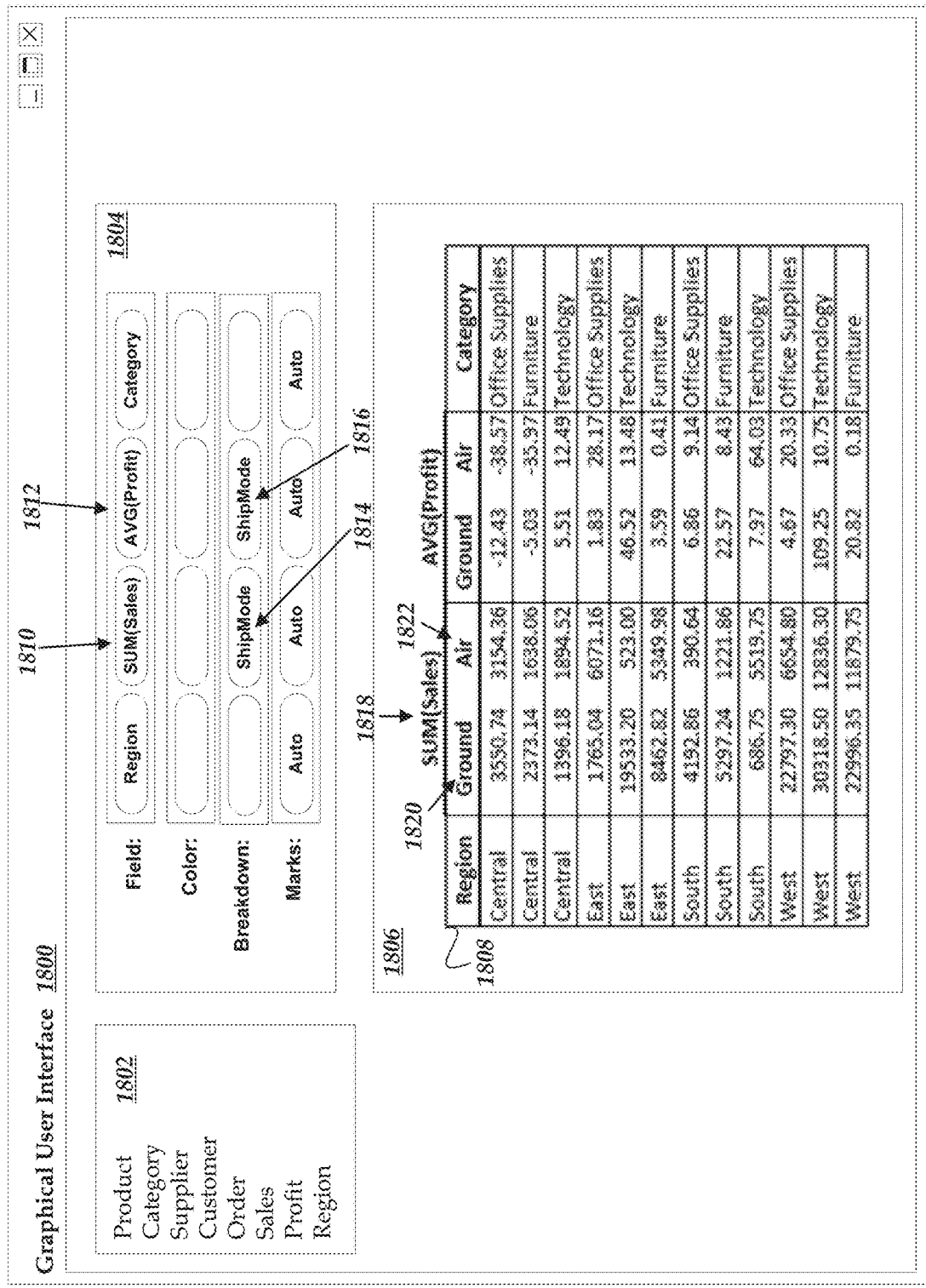
FIG. 18 illustrates of a logical schematic of a portion of a user interface for flexible table based visualizations in accordance with one or more of the various embodiments.
Figure 19:
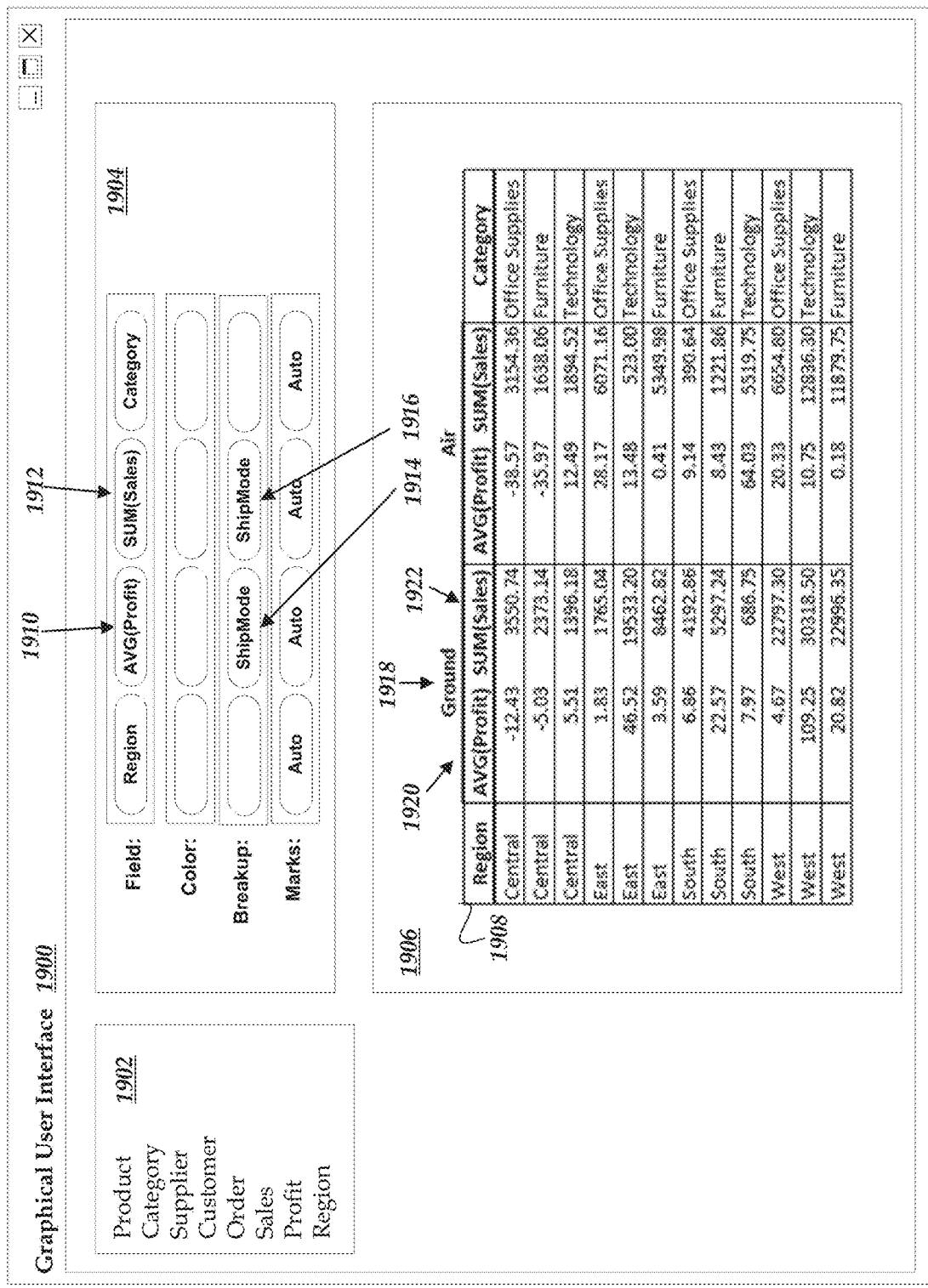
FIG. 19 illustrates of a logical schematic of a portion of a user interface for flexible table based visualizations in accordance with one or more of the various embodiments.

FIGS. 18-20 illustrates a non-limiting examples of view features flexible table based visualizations in accordance with at least one of the various embodiments. One of ordinary skill in the art will appreciate that other view features may be included in user interfaces without departing from the scope of the innovations described herein. Further, the below described view features are sufficient for one of ordinary skill in the art to understand and practice the innovations described herein.

FIG. 18 illustrates of a logical schematic of a portion of user interface 1800 for flexible table based visualizations in accordance with one or more of the various embodiments. As described above, visualization engines may be arranged to provide various panels, such as data panel 1802, shelf panel 1804, display panel 1806, or the like. The descriptions above (e.g., FIG. 5A, or the like) provide detailed descriptions of the use of these panels. As described above, table view specifications include a variety of view features. This example illustrates a breakdown view feature that enables data fields to be split or divided based on one or more characteristics or metrics.

In this example, a breakdown view feature has been applied to SUM(Sales) column field 1810 and AVG(Profit) column field 1812. In this example, the breakdown view features for the SUM(Sales) and AVG(Profit) column fields are directed to separating the SUM(Sales) and AVG(Profits) based on the type of shipping (e.g., ShipMode) that was used for the orders. In this example, there may be two shipping modes, Ground and Air. Thus, the visualization engine may be arranged to determine the SUM(Sales) for orders that used ground shipping and the SUM(Sales) values for orders that used Air shipping.

In some embodiments, visualization engines may be arranged to determine one or more breakdown categories that each correspond to a distinct value for the breakdown field. In this example, the breakdown field is "ShipMode" and because there are two shipping modes, visualization engines may determine two breakdown categories.

In one or more of the various embodiments, visualization engines may be arranged to generate a sub-column for each breakdown category and group them under the label for the associated column fields. Note, in this example, there are two qualifying shipping modes. If there was a third shipping mode, such as, Courier, a third sub-column that includes the amount of SUM(Sales) from orders that were shipped by Courier would be generated and included in table view 1908.

In some embodiments, additional qualifiers or filters may be associated with one or more breakdown fields, including, excluding one or more data objects from consideration, conditional filters, or the like.

In this example, column field 1810 and column field 1812 are associated with breakdown field 1814 and breakdown field 1816 respectively. In this example, the breakdown field (ShipMode) is that same for both column field 1810 and column field 1812. However, in other cases, the breakdown fields may be different. Likewise, in some cases, there may be more or fewer breakdown fields depending on the design of the table view specification.

In some embodiments, visualization engines may generate one or more sub-columns for each breakdown category. The number of sub-columns associated with a given breakdown category may depend on the number of column fields that may be associated with a particular breakdown field. In this example, there are two sub-columns for each breakdown category because two column fields (e.g., column field 1810 and column field 1812) both have the same breakdown field. Accordingly, in this example, sub-column 1820 corresponds to the AVG(Profit) of orders that used Ground shipping. Similarly, in this example, sub-column 1822 corresponds to the SUM(Sales) of orders that used Ground shipping.

FIG. 19 illustrates of a logical schematic of a portion of user interface 1900 for flexible table based visualizations in accordance with one or more of the various embodiments. As described above, visualization engines may be arranged to provide various panels, such as data panel 1902, shelf panel 1904, display panel 1906, or the like. The descriptions above (e.g., FIG. 5A, or the like) provide detailed descriptions of the use of these panels. As described above, table view specifications may include a variety of view features. This example illustrates a breakup view feature that enables data fields to be split or divided based on one or more characteristics or metrics.

In this example, a breakup view feature has been applied to the SUM(Sales) data field and the AVG(Profit) column field. In this example, the breakup view features for the SUM(Sales) and AVG(Profit) column fields are directed to grouping the SUM(Sales) and AVG(Profits) based on the type of shipping (e.g., ShipMode) that was used for the orders. In this example, there may be two shipping modes, Ground and Air. Thus, the visualization engine may be arranged to determine the SUM(Sales) for orders that used ground shipping and the SUM(Sales) values for orders that used Air shipping.

In one or more of the various embodiments, visualization engines may be arranged to generate a sub-column for each breakup item and group them under the label for the associated breakup fields. In this example, for some embodiments, adjacent column fields associated with the same breakup field (e.g., ShipMode) are grouped together. Note, in this example, there are assumed to be two qualifying shipping modes. If there was a third shipping mode, such as, Courier, a third column that includes the amount of Sales from orders that were shipped by Courier may be generated and displayed.

In some embodiments, additional qualifiers or filters may be associated with one or more breakup fields, including, excluding one or more data objects from consideration, conditional filters, or the like.

In this example, column field 1910 and column field 1912 are adjacent column fields that have the same breakup fields (breakup field 1914 and breakup field 1916). In this example, table view 1908 includes category columns, such as, category column 1918. Further, one or more category sub-columns, such as, sub-column 1920 and sub-column 1922 may be employed to display data items according to their associated category. In this example, sub-column 1920 may be configured to display the AVG(Profit) values for orders that were shipped by Ground. Likewise, in this example, sub-column 1922 may be configured to display SUM(Sales) values for orders that were shipped by Ground.

FIG. 20 illustrates of a logical schematic of a portion of user interface 2000 for flexible table based visualizations in accordance with one or more of the various embodiments. As described above, visualization engines may be arranged to provide various panels, such as data panel 2002, shelf panel 2004, display panel 2006, or the like. The descriptions above (e.g., FIG. 5A, or the like) provide detailed descriptions of the use of these panels. As described above, table view specifications may include a variety of view features.

In this example, for some embodiments, shelf panel 2004 includes a shelf row that declares that a minified visualization should be displayed in each cell of the AVG(Profit) column field. In this example, the X means that the corresponding field (e.g. TDAY(Date)) should be employed as the X coordinate for a line plot. In this example, TDAY(Date) is a time-value corresponding to the day of the value in the Date data field, and would plot all such values in the database, unless one or more filters may be applied. One of ordinary skill in the art will appreciate that various mini-visualizations may be defined in a table view specification, including bar graphs, line plots, (color) gradients, area plots, or the like.

What is claimed as new and desired to be protected by Letters Patent of the United States is:

1. A method for visualizing data over one or more networks using a computer that includes one or more processors, where each step of the method is performed by the one or more processors, comprising:
   generating a graphical user interface (GUI) that includes a shelf panel and a display panel, wherein two or more column fields and two are more rows are simultaneously displayed in the shelf panel;
      displaying a table view in the display panel, wherein the table view includes one or more columns that correspond to each column field;
   determining one or more data items based on a data source and the one or more column fields, wherein each column field corresponds to a portion of the one or more data items;
   displaying each portion of the one or more data items in a column of the table view that corresponds to the column field that corresponds to the portion of the one or more data items; and
   associating each view feature added to the one or more rows of the shelf panel with a column field added to a location above each view feature, wherein a visualization for each of the one or more added column fields in the table view is separately and simultaneously updated with the shelf panel based on the association of each added view feature to each of the added column fields in the shelf panel.

2. The method of claim 1, further comprising:
   displaying one or more data objects in a data panel that are associated with the data source; and
   determining the one or more column fields based on the one or more data objects displayed in the data panel.

3. The method of claim 1, further comprising:
   in response to a modification of the table view, performing further actions, including:
   modifying a table specification based on the modification of the table view, wherein the modifications to the table specification include, one or more of changing an order of the column fields based on a modified column order in the table view or adding one or more sorting view features based on a current sort order of the one or more data items.

4. The method of claim 1, further comprising:
   associating one or more marks with each column field based on a table specification; and
   displaying a value associated with each data item in the table view based on the one or more marks, wherein the one or more marks are one or more of text, formatted numbers, symbols, or visualizations that are displayed in one or more table cells for one or more data items.

5. The method of claim 1, wherein displaying each portion of the one or more data items in a column of the table view, further comprises:
   providing one or more records from the data source based on one or more queries, wherein each record includes values based on the data source and the one or more queries;
   generating one or more rows of the table view based on the one or more records, wherein each row includes data items that are in a same record; and
   in response, to a scrolling action, performing further actions, including:
      providing a scroll window area that includes a portion of the one or more rows based on the scrolling action, a size of the display panel, and an amount of rows in the table view; and
      determining a portion of the one or more rows to display based on the scroll window area.

6. The method of claim 1, wherein displaying each portion of the one or more data items in the column of the table view, further comprises:
   in response to determining two or more adjacent column fields associated with a same breakup field, performing further actions, including:
      determining one or more breakup categories based on the same breakup field, wherein each breakup category corresponds to a distinct value of the same breakup field;
      generating one or more category columns in the table view, wherein each category column corresponds to one of the one or more breakup categories;
      generating one or more sub-columns in each of the one or more category columns, wherein each sub-column corresponds to one of the two or more adjacent column fields;
      determining one or more category data items based on the portion of the one or more data items that correspond to each breakup category; and
      displaying the one or more category data items in the one or more sub-columns, wherein each category data item is displayed in one of the one or more sub-columns included in a category column that corresponds to its breakup category and its column field.

7. The method of claim 1, wherein displaying each portion of the one or more data items in the column of the table view, further comprises:
   in response to determining the one or more column fields associated with a minified visualization view feature, performing further actions, including:

executing one or more queries to provide one or more feature data items based on the one or more column fields associated with the minified visualization view feature;

generating one or more minified visualizations based on the one or more feature data items and the minified visualization view feature; and displaying the one or more minified visualizations in the one or more columns of the table view that correspond to the one or more column fields associated with the minified visualization view feature.

8. The method of claim 1, wherein displaying each portion of the one or more data items in the column of the table view, further comprises:

in response to determining one or more breakdown fields, performing further actions, including:

generating one or more regular columns for each column field that is unassociated with the one or more breakdown fields;

determining one or more breakdown categories based on the one or more breakdown fields, wherein each breakdown category corresponds to a distinct value of the one or more breakdown fields;

generating one or more sub-columns for each of the one or more breakdown categories, wherein each sub-column corresponds to a column field associated with the one or more breakdown fields, and wherein each sub-column is grouped together based on the one or more breakdown categories;

determining one or more regular data items based on the one or more data items that correspond to the one or more regular columns;

determining one or more breakdown data items based on the portion of the one or more data items that correspond to each breakdown category;

displaying the one or more regular data items in the one or more regular columns; and displaying each breakdown data item in the one or more sub-columns that correspond to its breakdown category and its column field.

9. A system for visualizing data over one or more networks, comprising:

a network computer, comprising:

a memory that stores at least instructions; and one or more processors that execute instructions that perform actions, including:

generating a graphical user interface (GUI) that includes a shelf panel and a display panel, wherein two or more column fields and two are more rows are simultaneously displayed in the shelf panel;

displaying a table view in the display panel, wherein the table view includes one or more columns that correspond to each column field;

determining one or more data items based on a data source and the one or more column fields, wherein each column field corresponds to a portion of the one or more data items;

displaying each portion of the one or more data items in a column of the table view that corresponds to the column field that corresponds to the portion of the one or more data items; and associating each view feature added to the one or more rows of the shelf panel with a column field added to a location above each view feature, wherein a visualization for each of the one or more added column fields in the table view is separately and simultaneously updated with the shelf panel based on the association of each added view feature to each of the added column fields in the shelf panel; and a client computer, comprising:

a memory that stores at least instructions; and one or more processors that execute instructions that perform actions, including:

displaying the graphical user interface.

10. The system of claim 9, wherein the one or more processors of the network computer execute instructions that perform actions, further comprising:

displaying one or more data objects in a data panel that are associated with the data source; and determining the one or more column fields based on the one or more data objects displayed in the data panel.

11. The system of claim 9, wherein the one or more processors of the network computer execute instructions that perform actions, further comprising:

in response to a modification of the table view, performing further actions, including:

modifying a table specification based on the modification of the table view, wherein the modifications to the table specification include, one or more of changing an order of the column fields based on a modified column order in the table view or adding one or more sorting view features based on a current sort order of the one or more data items.

12. The system of claim 9, wherein the one or more processors of the network computer execute instructions that perform actions, further comprising:

associating one or more marks with each column field based on a table specification; and displaying a value associated with each data item in the table view based on the one or more marks, wherein the one or more marks are one or more of text, formatted numbers, symbols, or visualizations that are displayed in one or more table cells for one or more data items.

13. The system of claim 9, wherein displaying each portion of the one or more data items in a column of the table view, further comprises:

providing one or more records from the data source based on one or more queries, wherein each record includes values based on the data source and the one or more queries;

generating one or more rows of the table view based on the one or more records, wherein each row includes data items that are in a same record; and in response, to a scrolling action, performing further actions, including:

providing a scroll window area that includes a portion of the one or more rows based on the scrolling action, a size of the display panel, and an amount of rows in the table view; and determining a portion of the one or more rows to display based on the scroll window area.

14. The system of claim 9, wherein displaying each portion of the one or more data items in the column of the table view, further comprises:

in response to determining two or more adjacent column fields associated with a same breakup field, performing further actions, including:

determining one or more breakup categories based on the same breakup field, wherein each breakup category corresponds to a distinct value of the same breakup field;

generating one or more category columns in the table view, wherein each category column corresponds to one of the one or more breakup categories;

generating one or more sub-columns in each of the one or more category columns, wherein each sub-column corresponds to one of the two or more adjacent column fields;

determining one or more category data items based on the portion of the one or more data items that correspond to each breakup category; and displaying the one or more category data items in the one or more sub-columns, wherein each category data item is displayed in one of the one or more sub-columns included in a category column that corresponds to its breakup category and its column field.

15. The system of claim 9, wherein displaying each portion of the one or more data items in the column of the table view, further comprises:

in response to determining the one or more column fields associated with a minified visualization view feature, performing further actions, including:

executing one or more queries to provide one or more feature data items based on the one or more column fields associated with the minified visualization view feature;

generating one or more minified visualizations based on the one or more feature data items and the minified visualization view feature; and displaying the one or more minified visualizations in the one or more columns of the table view that correspond to the one or more column fields associated with the minified visualization view feature.

16. The system of claim 9, wherein displaying each portion of the one or more data items in the column of the table view, further comprises:

in response to determining one or more breakdown fields, performing further actions, including:

generating one or more regular columns for each column field that is unassociated with the one or more breakdown fields;

determining one or more breakdown categories based on the one or more breakdown fields, wherein each breakdown category corresponds to a distinct value of the one or more breakdown fields;

generating one or more sub-columns for each of the one or more breakdown categories, wherein each sub-column corresponds to a column field associated with the one or more breakdown fields, and wherein each sub-column is grouped together based on the one or more breakdown categories;

determining one or more regular data items based on the one or more data items that correspond to the one or more regular columns;

determining one or more breakdown data items based on the portion of the one or more data items that correspond to each breakdown category;

displaying the one or more regular data items in the one or more regular columns; and displaying each breakdown data item in the one or more sub-columns that correspond to its breakdown category and its column field.

17. A processor readable non-transitory storage media that includes instructions for visualizing data over one or more networks, wherein execution of the instructions by one or more processors, performs actions, comprising:

generating a graphical user interface (GUI) that includes a shelf panel and a display panel, wherein two or more column fields and two are more rows are simultaneously displayed in the shelf panel;

displaying a table view in the display panel, wherein the table view includes one or more columns that correspond to each column field;

determining one or more data items based on a data source and the one or more column fields, wherein each column field corresponds to a portion of the one or more data items;

displaying each portion of the one or more data items in a column of the table view that corresponds to the column field that corresponds to the portion of the one or more data items; and associating each view feature added to the one or more rows of the shelf panel with a column field added to a location above each view feature, wherein a visualization for each of the one or more added column fields in the table view is separately and simultaneously updated with the shelf panel based on the association of each added view feature to each of the added column fields in the shelf panel.

18. The media of claim 17, further comprising:

displaying one or more data objects in a data panel that are associated with the data source; and determining the one or more column fields based on the one or more data objects displayed in the data panel.

19. The media of claim 17, further comprising:

in response to a modification of the table view, performing further actions, including:

modifying a table specification based on the modification of the table view, wherein the modifications to the table specification include, one or more of changing an order of the column fields based on a modified column order in the table view or adding one or more sorting view features based on a current sort order of the one or more data items.

20. The media of claim 17, further comprising:

associating one or more marks with each column field based on a table specification; and displaying a value associated with each data item in the table view based on the one or more marks, wherein the one or more marks are one or more of text, formatted numbers, symbols, or visualizations that are displayed in one or more table cells for one or more data items.

21. The media of claim 17, wherein displaying each portion of the one or more data items in a column of the table view, further comprises:

providing one or more records from the data source based on one or more queries, wherein each record includes values based on the data source and the one or more queries;

generating one or more rows of the table view based on the one or more records, wherein each row includes data items that are in a same record; and in response, to a scrolling action, performing further actions, including:

providing a scroll window area that includes a portion of the one or more rows based on the scrolling action, a size of the display panel, and an amount of rows in the table view; and determining a portion of the one or more rows to display based on the scroll window area.

22. The media of claim 17, wherein displaying each portion of the one or more data items in the column of the table view, further comprises:

in response to determining two or more adjacent column fields associated with a same breakup field, performing further actions, including:
  determining one or more breakup categories based on the same breakup field, wherein each breakup category corresponds to a distinct value of the same breakup field;
  generating one or more category columns in the table view, wherein each category column corresponds to one of the one or more breakup categories;
  generating one or more sub-columns in each of the one or more category columns, wherein each sub-column corresponds to one of the two or more adjacent column fields;
  determining one or more category data items based on the portion of the one or more data items that correspond to each breakup category; and
  displaying the one or more category data items in the one or more sub-columns, wherein each category data item is displayed in one of the one or more sub-columns included in a category column that corresponds to its breakup category and its column field.

23. The media of claim 17, wherein displaying each portion of the one or more data items in the column of the table view, further comprises:
  in response to determining the one or more column fields associated with a minified visualization view feature, performing further actions, including:
    executing one or more queries to provide one or more feature data items based on the one or more column fields associated with the minified visualization view feature;
    generating one or more minified visualizations based on the one or more feature data items and the minified visualization view feature; and
    displaying the one or more minified visualizations in the one or more columns of the table view that correspond to the one or more column fields associated with the minified visualization view feature.

24. The media of claim 17, wherein displaying each portion of the one or more data items in the column of the table view, further comprises:
  in response to determining one or more breakdown fields, performing further actions, including:
    generating one or more regular columns for each column field that is unassociated with the one or more breakdown fields;
    determining one or more breakdown categories based on the one or more breakdown fields, wherein each breakdown category corresponds to a distinct value of the one or more breakdown fields;
    generating one or more sub-columns for each of the one or more breakdown categories, wherein each sub-column corresponds to a column field associated with the one or more breakdown fields, and wherein each sub-column is grouped together based on the one or more breakdown categories;
    determining one or more regular data items based on the one or more data items that correspond to the one or more regular columns;
    determining one or more breakdown data items based on the portion of the one or more data items that correspond to each breakdown category;
    displaying the one or more regular data items in the one or more regular columns; and
    displaying each breakdown data item in the one or more sub-columns that correspond to its breakdown category and its column field.

25. A network computer for visualizing data over one or more networks, comprising:
  a memory that stores at least instructions; and
  one or more processors that execute instructions that perform actions, including:
    generating a graphical user interface (GUI) that includes a shelf panel and a display panel, wherein two or more column fields and two are more rows are simultaneously displayed in the shelf panel;
    displaying a table view in the display panel, wherein the table view includes one or more columns that correspond to each column field;
    determining one or more data items based on a data source and the one or more column fields, wherein each column field corresponds to a portion of the one or more data items;
    displaying each portion of the one or more data items in a column of the table view that corresponds to the column field that corresponds to the portion of the one or more data items; and
    associating each view feature added to the one or more rows of the shelf panel with a column field added to a location above each view feature, wherein a visualization for each of the one or more added column fields in the table view is separately and simultaneously updated with the shelf panel based on the association of each added view feature to each of the added column fields in the shelf panel.

26. The network computer of claim 25, wherein the one or more processors execute instructions that perform actions, further comprising:
  displaying one or more data objects in a data panel that are associated with the data source; and
  determining the one or more column fields based on the one or more data objects displayed in the data panel.

27. The network computer of claim 25, wherein the one or more processors execute instructions that perform actions, further comprising:
  in response to a modification of the table view, performing further actions, including:
    modifying a table specification based on the modification of the table view, wherein the modifications to the table specification include, one or more of changing an order of the column fields based on a modified column order in the table view or adding one or more sorting view features based on a current sort order of the one or more data items.

28. The network computer of claim 25, wherein the one or more processors execute instructions that perform actions, further comprising:
  associating one or more marks with each column field based on a table specification; and
  displaying a value associated with each data item in the table view based on the one or more marks, wherein the one or more marks are one or more of text, formatted numbers, symbols, or visualizations that are displayed in one or more table cells for one or more data items.

29. The network computer of claim 25, wherein displaying each portion of the one or more data items in a column of the table view, further comprises:
  providing one or more records from the data source based on one or more queries, wherein each record includes values based on the data source and the one or more queries;

generating one or more rows of the table view based on the one or more records, wherein each row includes data items that are in a same record; and in response, to a scrolling action, performing further actions, including:

provinding a scroll window area that includes a portion of the one or more rows based on the scrolling action, a size of the display panel, and an amount of rows in the table view; and determining a portion of the one or more rows to display based on the scroll window area.

30. The network computer of claim 25, wherein displaying each portion of the one or more data items in the column of the table view, further comprises:

in response to determining two or more adjacent column fields associated with a same breakup field, performing further actions, including:

determining one or more breakup categories based on the same breakup field, wherein each breakup category corresponds to a distinct value of the same breakup field;

generating one or more category columns in the table view, wherein each category column corresponds to one of the one or more breakup categories;

generating one or more sub-columns in each of the one or more category columns, wherein each sub-column corresponds to one of the two or more adjacent column fields;

determining one or more category data items based on the portion of the one or more data items that correspond to each breakup category; and displaying the one or more category data items in the one or more sub-columns, wherein each category data item is displayed in one of the one or more sub-columns included in a category column that corresponds to its breakup category and its column field.

31. The network computer of claim 25, wherein displaying each portion of the one or more data items in the column of the table view, further comprises:

in response to determining the one or more column fields associated with a minified visualization view feature, performing further actions, including:

executing one or more queries to provide one or more feature data items based on the one or more column fields associated with the minified visualization view feature;

generating one or more minified visualizations based on the one or more feature data items and the minified visualization view feature; and displaying the one or more minified visualizations in the one or more columns of the table view that correspond to the one or more column fields associated with the minified visualization view feature.

32. The network computer of claim 25, wherein displaying each portion of the one or more data items in the column of the table view, further comprises:

in response to determining one or more breakdown fields, performing further actions, including:

generating one or more regular columns for each column field that is unassociated with the one or more breakdown fields;

determining one or more breakdown categories based on the one or more breakdown fields, wherein each breakdown category corresponds to a distinct value of the one or more breakdown fields;

generating one or more sub-columns for each of the one or more breakdown categories, wherein each sub-column corresponds to a column field associated with the one or more breakdown fields, and wherein each sub-column is grouped together based on the one or more breakdown categories;

determining one or more regular data items based on the one or more data items that correspond to the one or more regular columns;

determining one or more breakdown data items based on the portion of the one or more data items that correspond to each breakdown category;

displaying the one or more regular data items in the one or more regular columns; and displaying each breakdown data item in the one or more sub-columns that correspond to its breakdown category and its column field.

* * * * *